United States Patent
Suzuki

(10) Patent No.: US 9,348,444 B2
(45) Date of Patent: May 24, 2016

(54) INFORMATION PROCESSING APPARATUS AND STORAGE MEDIUM FOR STORING INFORMATION PROCESSING PROGRAM

(71) Applicant: Nintendo Co., Ltd., Kyoto (JP)

(72) Inventor: Toshiaki Suzuki, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 31 days.

(21) Appl. No.: 14/159,479

(22) Filed: Jan. 21, 2014

(65) Prior Publication Data

US 2014/0135126 A1 May 15, 2014

Related U.S. Application Data

(63) Continuation of application No. 11/783,496, filed on Apr. 10, 2007, now Pat. No. 8,711,101.

(30) Foreign Application Priority Data

Feb. 20, 2007 (JP) ................. 2007-039931

(51) Int. Cl.
*G06F 3/041* (2006.01)
*A63F 13/40* (2014.01)
(Continued)

(52) U.S. Cl.
CPC ................ *G06F 3/041* (2013.01); *A63F 13/06* (2013.01); *A63F 13/10* (2013.01); *G06F 3/0488* (2013.01); *A63F 2300/1075* (2013.01); *A63F 2300/204* (2013.01); *A63F 2300/6045* (2013.01); *A63F 2300/64* (2013.01)

(58) Field of Classification Search
CPC ..... G06F 3/041; G06F 3/0416; G06F 3/0412; G06F 3/04883; G06F 3/03545; G06F 3/0488; G06F 3/017; G06F 3/016
USPC .............. 345/172–178, 156, 901; 178/18.01, 178/19.03, 19.04; 725/52, 39
See application file for complete search history.

(56) References Cited

U.S. PATENT DOCUMENTS

| | | | |
|---|---|---|---|
| 5,777,605 A | 7/1998 | Yoshinobu et al. | |
| 6,424,338 B1 * | 7/2002 | Anderson | ............... 345/173 |
| 7,415,676 B2 | 8/2008 | Fujita | |

(Continued)

FOREIGN PATENT DOCUMENTS

| | | |
|---|---|---|
| JP | 11-53115 | 2/1999 |
| JP | 11-327433 | 11/1999 |

(Continued)

OTHER PUBLICATIONS

Notice of Reasons for Rejection issued Dec. 26, 2008 in corresponding Japanese Application No. 2007-039931.

(Continued)

*Primary Examiner* — Olga Merkoulova
(74) *Attorney, Agent, or Firm* — Nixon & Vanderhye P.C.

(57) ABSTRACT

An input coordinate point on the display surface of a display device is obtained from a pointing device. Based on the input coordinate point, a moving velocity is set, and based on the moving velocity, an object is moved to a position in the virtual space, the position corresponding to the input coordinate point. The input coordinate point may belong to different areas of the display surface and the moving velocity is determined based on the area where the input coordinate point belongs. Then, the display device is caused to display the virtual space within the display area.

7 Claims, 15 Drawing Sheets

(51) Int. Cl.
*G06F 3/0488* (2013.01)
*A63F 13/20* (2014.01)

(56) References Cited

U.S. PATENT DOCUMENTS

| | | | |
|---|---|---|---|
| 7,578,742 | B2 | 8/2009 | Miyamoto et al. |
| 7,640,518 | B2 | 12/2009 | Forlines et al. |
| 2004/0088727 | A1 | 5/2004 | Kamiya |
| 2005/0215323 | A1* | 9/2005 | Miyamoto et al. ............. 463/43 |
| 2006/0019752 | A1 | 1/2006 | Ohta |
| 2006/0019753 | A1 | 1/2006 | Ohta |
| 2006/0052165 | A1 | 3/2006 | Ohta |
| 2006/0217196 | A1 | 9/2006 | Kikkawa et al. |
| 2006/0258455 | A1 | 11/2006 | Kando |
| 2006/0267959 | A1 | 11/2006 | Goto et al. |
| 2006/0281546 | A1 | 12/2006 | Iwamoto et al. |
| 2006/0281549 | A1 | 12/2006 | Iwamoto et al. |
| 2007/0024597 | A1* | 2/2007 | Matsuoka ..................... 345/173 |
| 2007/0291007 | A1 | 12/2007 | Forlines et al. |

FOREIGN PATENT DOCUMENTS

| | | |
|---|---|---|
| JP | 2000-181617 | 6/2000 |
| JP | 2002-323850 | 11/2002 |
| JP | 2004-78693 | 3/2004 |
| JP | 2005-095444 | 4/2005 |
| JP | A-2006-34517 | 2/2006 |
| JP | 2006-68387 | 3/2006 |
| JP | 2006-247254 A | 9/2006 |
| JP | 2006-314536 | 11/2006 |
| JP | 2006-331109 | 12/2006 |
| JP | A-2006-325695 | 12/2006 |
| JP | 2007-010645 | 1/2007 |
| JP | 2007-34634 | 2/2007 |
| JP | 2007-34793 A | 2/2007 |

OTHER PUBLICATIONS

Explanation of Circumstances Concerning Accelerated Examination issued Oct. 16, 2008 in corresponding Japanese Application No. 2007-039931.

U.S. Patent and Trademark Office, "Final Office Action," (16 pages) issued in connection with U.S. Appl. No. 14/159,473, dated Jun. 4, 2015.

U.S. Patent and Trademark Office, "Final Office Action," (21 pages) issued in connection with U.S. Appl. No. 14/159,485, dated Jun. 29, 2015.

* cited by examiner

F I G. 8
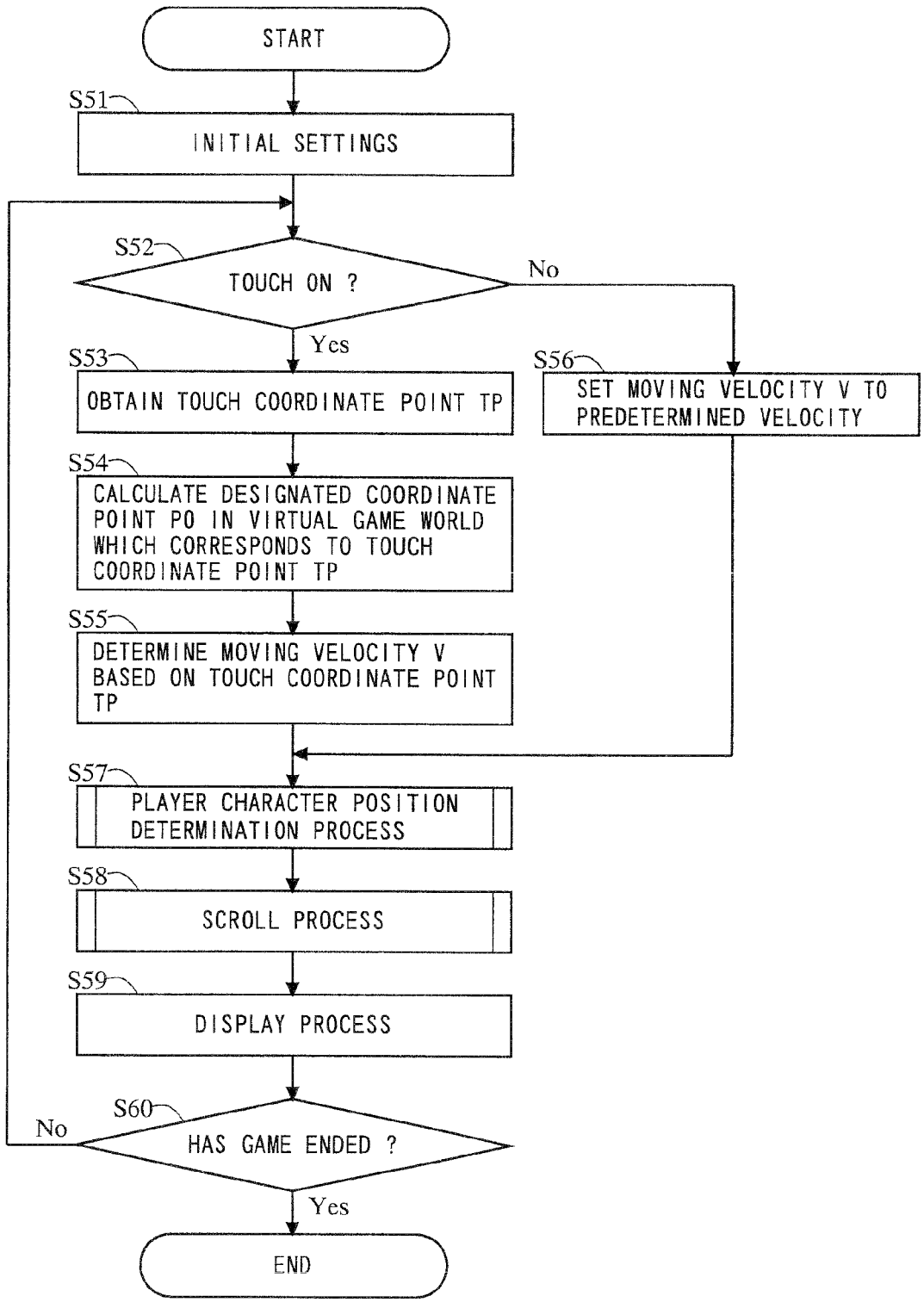

INFORMATION PROCESSING APPARATUS AND STORAGE MEDIUM FOR STORING INFORMATION PROCESSING PROGRAM

CROSS REFERENCE TO RELATED APPLICATIONS

This application is a continuation of U.S. application Ser. No. 11/783,496, filed Apr. 10, 2007, now allowed, which claims priority to Japanese Patent Application No. 2007-039931, filed on Feb. 20, 2007, each of which is incorporated herein by reference in their entirety.

TECHNICAL FIELD

Certain exemplary embodiments relate to an information processing apparatus and a storage medium storing an information processing program. Certain exemplary embodiments particularly relate to an information processing apparatus and a storage medium storing an information processing program, in which the information processing apparatus such as a personal computer or game apparatus, which is operated by a pointing device for inputting a coordinate point on a display screen, is used for moving an object.

BACKGROUND AND SUMMARY

Conventionally, there has been an apparatus for moving an object such as a player character, which apparatus is, for example, a personal computer, game apparatus or the like which is operated by a pointing device for inputting a coordinate point on a display screen. For example, Japanese Laid-Open Patent Publication No. 2000-181617 (hereinafter, referred to as Patent Document 1) discloses a scroll control method for performing a pointing operation, e.g., moving a cursor or scrolling a screen, based on an input of a coordinate point designated by a touch pad which is a pointing device.

However, the method disclosed by the above Patent Document 1 requires at least two areas to be used in order to perform both screen scroll and cursor control by touch operations. This increases the number of operations to be performed. Further, a scroll area is not provided in such a position, in relation to a display screen, as to allow the user to perform screen scrolling intuitively and easily. Therefore, when moving an object in accordance with a coordinate point input by using the method disclosed by the Patent Document 1, the user is not allowed to perform an intuitive operation input.

Therefore, feature of certain exemplary embodiments is to provide an information processing apparatus and a storage medium for storing an information processing program, which allow, in operations for moving an object by using coordinate point inputs provided from a pointing device, operation inputs to be performed more easily and intuitively. Another feature of certain exemplary embodiments is to provide an information processing apparatus and a storage medium storing an information processing program, which allow both a moving direction and a destination of the object to be specified by a series of operation inputs.

Certain exemplary embodiments have the following aspects to achieve the features mentioned above. Note that reference numerals, step numbers and the like indicated between parentheses are merely provided to facilitate the understanding of the certain exemplary embodiments and are not intended to be limiting in any way.

A first aspect is an information processing apparatus (1) for displaying a virtual space on a display device (12) and moving an object (PC) in the virtual space in accordance with an output from a pointing device (15), which pointing device outputs an input coordinate point (TP) based on a screen coordinate system of the display device in accordance with an operation performed by a user. The information processing apparatus comprises coordinate point obtaining means (CPU core 21 performing steps 53 and 93; hereinafter, only step numbers will be mentioned), control selection means (S52, S92), first control means (S53 to S55, S57, S58, S94, S95), second control means (S56 to S58, S96 to S98) and display control means (S59, S99). The coordinate point obtaining means obtains the input coordinate point from the pointing device. The control selection means selects, based on an operation performed by the user, either one of a first control and a second control which is different from the first control. The first control means calculates, when the control selection means has selected the first control, a movement vector (Pm, M) based on the input coordinate point and a predetermined coordinate point (Ppc, center of the screen), and moves a display area of the virtual space in accordance with the movement vector, which display area is displayed on the display device. The second control means moves, when the control selection means has selected the second control, the object to a position (Pm) in the virtual space, the position corresponding to the input coordinate point. The display control means causes the display device to display the virtual space within the display area. Here, the pointing device is an input device for designating an input position or coordinate point on a screen. Such a pointing device is realized in, e.g., a system for detecting a position on a screen which is pointed by a touch panel, mouse, track pad, track ball, a housing of a game controller, or the like.

In a second aspect based on the first aspect, the pointing device is a touch panel (15) covering a display screen of the display device. The coordinate point obtaining means obtains, as the input coordinate point, a touch coordinate point (TP) outputted from the touch panel. The control selection means selects the first control when the user is performing a touch operation on the touch panel, and selects the second control when the user is not performing a touch operation on the touch panel. When the touch panel is in a state of being touched, the first control means calculates the movement vector based on a current touch coordinate point obtained by the coordinate point obtaining means and the a predetermined coordinate point. When the touch panel is in a state of not being touched, the second control means moves the object to a position in the virtual space, the position corresponding to the touch coordinate point which the coordinate point obtaining means has obtained immediately before the touch-panel has entered the state of not being touched.

In a third aspect based on the second aspect, when the touch panel is in the state of being touched, the first control means moves the object in the virtual space in accordance with the movement vector, and then, based on a position of the object, moves the display area of the virtual space which is displayed on the display device.

In a fourth aspect based on the second aspect, the second control means further moves, based on the position of the object in the virtual space, the display area of the virtual space which is displayed on the display device.

In a fifth aspect based on the third aspect, the first control means determines, based on a position of a touch coordinate point on the display screen of the display device, a moving velocity (V) at which the object moves within the virtual space.

In a sixth aspect based on the second aspect, the movement vector is a vector from a predetermined coordinate point on the touch panel to the touch coordinate point.

In a seventh aspect based on the second aspect, the movement vector is a vector from a predetermined coordinate point in the virtual space to a coordinate point in the virtual space which coincides with the touch coordinate point.

In an eighth aspect based on the second aspect, the movement vector is a vector from a coordinate point indicating a position of the object placed in the virtual space to a coordinate point in the virtual space which coincides with the touch coordinate point.

In a ninth aspect based on the second aspect, the first control means: calculates the movement vector from a coordinate point indicating a position of the object placed in the virtual space to a coordinate point in the virtual space which coincides with the current touch coordinate point obtained by the coordinate point obtaining means; moves the object within the virtual space in accordance with the movement vector; and moves the display area of the virtual space such that the position of the object is at a center of the display area. The second control means moves the object to a position in the virtual space, which position coincides with the touch coordinate point which the coordinate point obtaining means has obtained immediately before the touch-panel has entered the state of not being touched, and moves the display area of the virtual space such that the position of the object is at the center of the display area.

An eleventh aspect is an information processing apparatus for displaying a virtual space on a display device and moving an object in the virtual space in accordance with an output from a pointing device, which pointing device outputs an input coordinate point based on a screen coordinate system of the display device in accordance with an operation performed by a user. The information processing apparatus comprises coordinate point obtaining means (S113), control selection means (S112), first control means (S114, S115), second control means (S116 to S118) and display control means (S119). The coordinate point obtaining means obtains the input coordinate point from the pointing device. The control selection means selects, based on an operation performed by the user, either one of a first control and a second control which is different from the first control. The first control means calculates, when the control selection means has selected the first control, a movement vector based on the an input coordinate point and a predetermined coordinate point, and moves the object within the virtual space in accordance with the movement vector. The second control means moves, when the control selection means has selected the second control, the object to a position in the virtual space, the position corresponding to the input coordinate point. The display control means causes the display device to display a display area of the virtual space.

In a twelfth aspect based on the eleventh aspect, the pointing device is a touch panel covering a display screen of the display device. The coordinate point obtaining means obtains, as the input coordinate point, a touch coordinate point outputted from the touch panel. The control selection means selects the first control when the user is performing a touch operation on the touch panel, and selects the second control when the user is not performing a touch operation on the touch panel. When the touch panel is in a state of being touched, the first control means calculates the movement vector based on a current touch coordinate point obtained by the coordinate point obtaining means and the predetermined coordinate point. When the touch panel is in a state of not being touched, the second control means moves the object to a position in the virtual space, the position corresponding to the touch coordinate point which the coordinate point obtaining means has obtained immediately before the touch-panel has entered the state of not being touched.

In tenth and thirteenth aspects respectively based on the first and eleventh aspects, the control selection means selects the first control when a predetermined operation signal different from the input coordinate point is being inputted, and selects the second control when the predetermined operation signal is not inputted. When the predetermined operation signal is being inputted, the first control means calculates the movement vector based on a current input coordinate point obtained by the coordinate point obtaining means and the predetermined coordinate point. When the predetermined operation signal is not inputted, the second control means moves the object to a position in the virtual space, the position corresponding to the input coordinate point which the coordinate point obtaining means has obtained immediately before the predetermined operation signal has ceased to be inputted. Here, referred to as the predetermined operation signal is a signal indicating a presence, absence or change of an input which is different from a coordinate point input. For example, either one of the first and second controls is selected based on: whether or not an operation button provided on a controller is being pressed; a change in a signal from a detection unit (such as an acceleration sensor) provided on the controller; or a change in a voice inputted to voice input means such as a microphone.

A fourteenth aspect is a storage medium storing an information processing program to be executed by a computer (21) of an information processing apparatus for displaying a virtual space on a display device and moving an object in the virtual space in accordance with an output from a pointing device, which pointing device outputs an input coordinate point based on a screen coordinate system of the display device in accordance with an operation performed by a user. The information processing program causes the computer to function as coordinate point obtaining means, control selection means, first control means, second control means and display control means. The coordinate point obtaining means obtains the input coordinate point from the pointing device. The control selection means selects, based on an operation performed by the user, either one of a first control and a second control which is different from the first control. The first control means calculates, when the control selection means has selected the first control, a movement vector based on the input coordinate point and a predetermined coordinate point, and moves a display area of the virtual space in accordance with the movement vector, which display area is displayed on the display device. The second control means moves, when the control selection means has selected the second control, the object to a position in the virtual space, the position corresponding to the input coordinate point. The display control means causes the display device to display the virtual space within the display area.

A twenty-fourth aspect is a storage medium storing an information processing program to be executed by a computer of an information processing apparatus for displaying a virtual space on a display device and moving an object in the virtual space in accordance with an output from a pointing device, which pointing device outputs an input coordinate point based on a screen coordinate system of the display device in accordance with an operation performed by a user. The information processing program causes the computer to function as coordinate point obtaining means, control selection means, first control means, second control means and display control means. The coordinate point obtaining means obtains the input coordinate point from the pointing device. The control selection means selects, based on an operation performed by the user, either one of a first control and a second control which is different from the first control. The first control means calculates, when the control selection means has selected the first control, a movement vector based on the input coordinate point and a predetermined coordinate point, and moves the object within the virtual space in accordance with the movement vector. The second control means moves, when the control selection means has selected the second control, the object to a position in the virtual space, the position corresponding to the input coordinate point. The display control means causes the display device to display a display area of the virtual space.

In fifteenth and twenty-fifth aspects respectively based on the fourteenth and twenty-fourth aspects, the pointing device is a touch panel covering a display screen of the display device. The coordinate point obtaining means obtains, as the input coordinate point, a touch coordinate point outputted from the touch panel. The control selection means selects the first control when the user is performing a touch operation on the touch panel, and selects the second control when the user is not performing a touch operation on the touch panel. When the touch panel is in a state of being touched, the first control means calculates the movement vector based on a current touch coordinate point obtained by the coordinate point obtaining means and the predetermined coordinate point. When the touch panel is in a state of not being touched, the second control means moves the object to a position in the virtual space, the position corresponding to the touch coordinate point which the coordinate point obtaining means has obtained immediately before the touch-panel has entered the state of not being touched.

In sixteenth and twenty-sixth aspects respectively based on the fifteenth and twenty-fifth aspects, when the touch panel is in the state of being touched, the first control means moves the object in the virtual space in accordance with the movement vector, and then, based on a position of the object, moves the display area of the virtual space which is displayed on the display device.

In seventeenth and twenty-seventh aspects respectively based on the fifteenth and twenty-fifth aspects, the second control means further moves, based on the position of the object in the virtual space, the display area of the virtual space, which is displayed on the display device.

In eighteenth and twenty-eighth aspects respectively based on the sixteenth and twenty-sixth aspects, the first control means determines, based on a position of a touch coordinate point on the display screen of the display device, a moving velocity at which the object moves within the virtual space.

In nineteenth and twenty-ninth aspects respectively based on the fifteenth and twenty-fifth aspects, the movement vector is a vector from a predetermined coordinate point on the touch panel to the touch coordinate point.

In twentieth and thirtieth aspects respectively based on the fifteenth and twenty-fifth aspects, the movement vector is a vector from a predetermined coordinate point in the virtual space to a coordinate point in the virtual space which coincides with the touch coordinate point.

In twenty-first and thirty-first aspects respectively based on the fifteenth and twenty-fifth aspects, the movement vector is a vector from a coordinate point indicating a position of the object placed in the virtual space to a coordinate point in the virtual space which coincides with the touch coordinate point.

In twenty-second and thirty-second aspects respectively based on the fifteenth and twenty-fifth aspects, the first control means: calculates the movement vector from a coordinate point indicating a position of the object placed in the virtual space to a coordinate point in the virtual space which coincides with the current touch coordinate point obtained by the coordinate point obtaining means; moves the object within the virtual space in accordance with the movement vector; and moves the display area of the virtual space such that the position of the object is at a center of the display area. The second control means moves the object to a position in the virtual space, which position coincides with the touch coordinate point which the coordinate point obtaining means has obtained immediately before the touch-panel has entered the state of not being touched, and moves the display area of the virtual space such that the position of the object is at the center of the display area.

In twenty-third and thirty-third aspects respectively based on the fourteenth and twenty-fourth aspects, the control selection means selects the first control when a predetermined operation signal different from the input coordinate point is being inputted, and selects the second control when the predetermined operation signal is not inputted. When the predetermined operation signal is being inputted, the first control means calculates the movement vector based on a current input coordinate point obtained by the coordinate point obtaining means and the predetermined coordinate point. When the predetermined operation signal is not inputted, the second control means moves the object to a position in the virtual space, the position corresponding to the input coordinate point which the coordinate point obtaining means has obtained immediately before the predetermined operation signal has ceased to be inputted.

According to the above first aspect, an operation for continuously moving the display area and an operation for specifying a destination of the object can be both performed by a series of operations performed by a user. In other words, the user is allowed to specify the destination of the object while changing the display area displayed on the display screen, and perform such an operation intuitively.

The above third aspect enables an operation, for moving the display area in accordance with the position of the object while continuously moving the object, to be performed in response to the touch operation performed on the touch panel.

The above fourth aspect allows an operation, for moving the display area in accordance with the position of the object while moving the object to a position at which a touch operation has been performed immediately before the touch panel has entered the state of not being touched, to be performed in response to a cessation of the touch operation on the touch panel.

According to the above fifth aspect, the moving velocity of the object changes based on a position touched by the user. For example, a game process, for causing the moving velocity which is set when an outer edge portion of the touch panel is touched to be higher than the moving velocity which is set when a position near the center of the touch panel is touched, is allowed to be performed.

According to the above sixth aspect, the object can be moved in accordance with the movement vector based on the touch panel coordinate system.

According to the above seventh aspect, the object can be moved in accordance with the movement vector based on a coordinate system set in the virtual space.

According to the above eighth aspect, in the coordinate system set in the virtual space, the object can be moved in accordance with the movement vector based on the position of the object placed in the virtual space.

The above ninth aspect enables an operation, for moving the display area in accordance with the position of the object while continuously moving the object, to be performed in response to the touch operation performed on the touch panel, and also enables an operation, for moving the display area in accordance with the position of the object while moving the object to a position at which a touch operation has been performed immediately before the touch panel has entered the state of not being touched, to be performed in response to a cessation of the touch operation on the touch panel.

According to the above eleventh aspect, an operation for continuously moving the object and an operation for specifying the destination of the object can be both performed by a series of operations performed by the user. In other words, the user is allowed to specify the destination of the object while continuously moving the object, and perform such an operation intuitively.

According to the above second and twelfth aspects, in the case where a touch panel is used as a pointing device, a plurality of operation instructions can be intuitively given by a series of touch operations from a start of a touch operation to a time point immediately after the touch panel has entered the state of not being touched.

According to the above tenth and thirteenth aspects, a plurality of operation instructions can be intuitively given based on a series of coordinate point input operations, by selecting the first control or second control in accordance with whether or not an operation signal is being inputted, for example, whether or not an operation button is being pressed.

Further, according to the storage medium storing the information processing program of certain exemplary embodiments, the same effects as those of the above-described information processing apparatus can be obtained.

These and other features, aspects and advantages of the certain exemplary embodiments described herein will become more apparent from the following detailed description when taken in conjunction with the accompanying drawings.

BRIEF DESCRIPTION OF THE DRAWINGS

FIG. 8 is a flowchart showing a game process which the game apparatus 1 performs by executing the game program of an exemplary embodiment;

DETAILED DESCRIPTION

Figure 1:
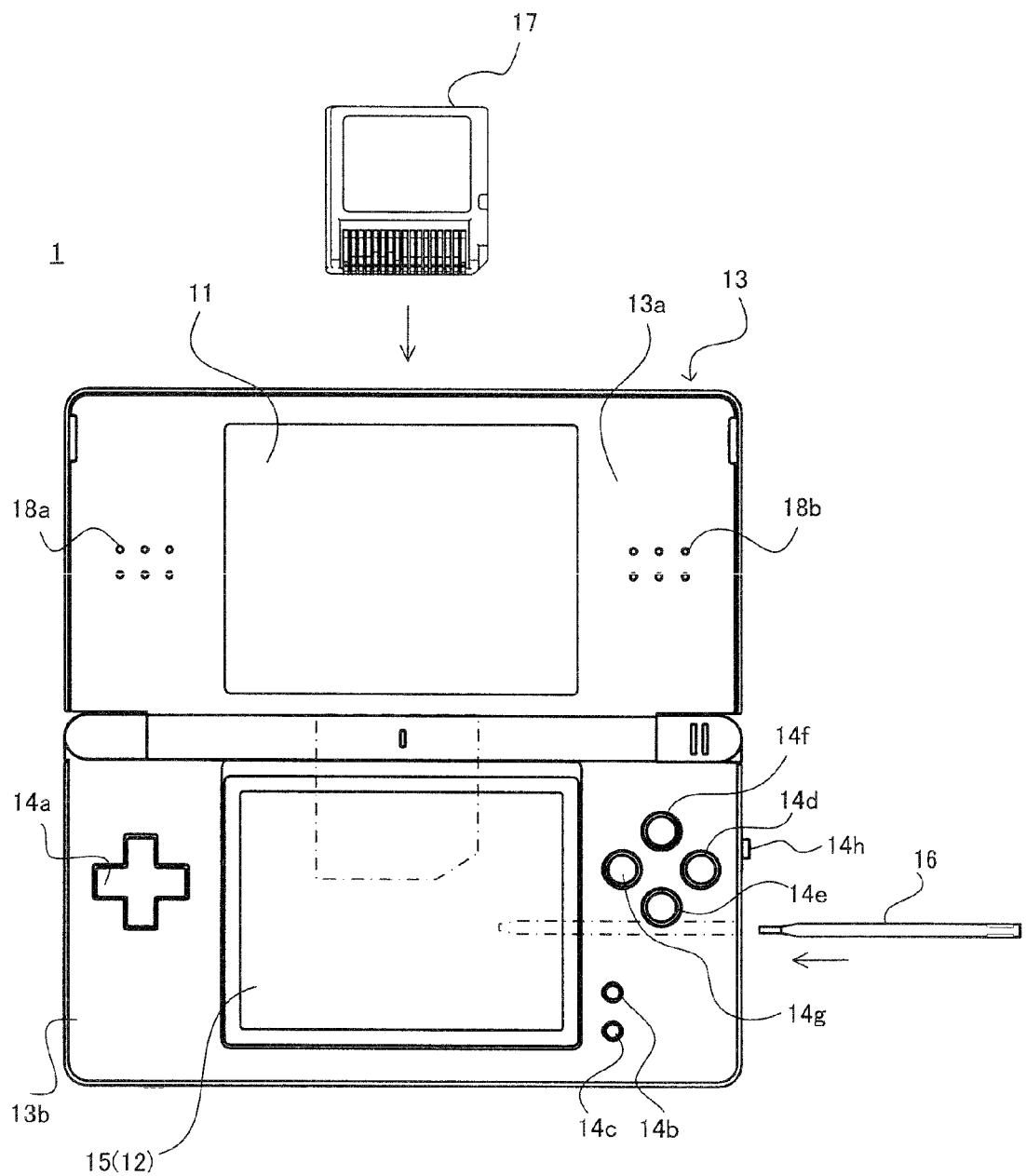
FIG. 1 is an external view of a game apparatus 1 executing a game program of an exemplary embodiment.

With reference to the drawings, an information processing apparatus executing an information processing program according to an exemplary embodiment will be described. The information processing program according to certain exemplary embodiments can be applied by being executed by an arbitrary computer system which is capable of providing a display on a display device. Hereinafter, a description will be given using the information processing program contained in a game program executed by a game apparatus 1 which is an example of the information processing apparatus. FIG. 1 is an external view of the game apparatus 1 executing the game program of certain exemplary embodiments. Here, a handheld game apparatus is shown as an example of the game apparatus 1.

In FIG. 1, the game apparatus 1 includes a first LCD (Liquid Crystal Display) 11 and a second LCD 12. A housing 13 comprises an upper housing 13a and a lower housing 13b, and the first LCD 11 is accommodated in the upper housing 13a, and the second LCD 12 is accommodated in the lower housing 13b. Resolutions of the first LCD 11 and second LCD 12 are both 256 dots×192 dots. Note that, although an LCD is used as a display device in this exemplary embodiment, any other display devices such as a display device using an EL (Electro Luminescence) may be used. Also, the resolutions of the first LCD 11 and second LCD 12 may be at any level.

The upper housing 13a is provided with sound holes 18a and 18b for outputting sounds from a later-described pair of loudspeakers (30a and 30b shown in FIG. 2) to the exterior.

The lower housing 13b is provided with input devices as follows; a cross switch 14a, a start switch 14b, a select switch 14c, an "A" button 14d, a "B" button 14e, an "X" button 14f, a "Y" button 14g, a power switch 14h, an "L" button 14L, and an "R" button 14R. Here, the L button 14L and R button 14R are provided on a side surface of an upper portion of the lower housing 13b. Since the L button 14L and R button 14R are provided behind the upper housing 13a shown in FIG. 1, these buttons are not shown in FIG. 1. In addition, a touch panel 15 is provided on a screen of the second LCD 12 as another input device. The lower housing 13b further includes insertion openings (shown by dashed-dotted lines in FIG. 1) for storing a memory card 17 and a stick 16.

The touch panel 15 may be of any type such as a resistive film type, an optical type (infrared type), or a capacitive coupling type. The touch panel 15 is an exemplary pointing device having a function of outputting, when a surface thereof is touched with the stick 16, coordinate point data which corresponds to a touch position. Though the following description is provided on an assumption that the player uses the stick 16 to perform a touch operation on the touch panel 15, of course the touch operation on the touch panel 15 may be performed using a pen (stylus pen) or a finger instead of the stick 16. The touch panel 15 used in this exemplary embodiment has a same resolution at 256 dots×192 dots (detection accuracy) as that of the second LCD 12. However, the resolutions of the touch panel 15 and the second LCD 12 may not necessarily be consistent with each other.

The memory card 17 is a storage medium having a game program stored therein, and placed in the insertion slot provided at the lower housing 13b in a removable manner.

Figure 2:
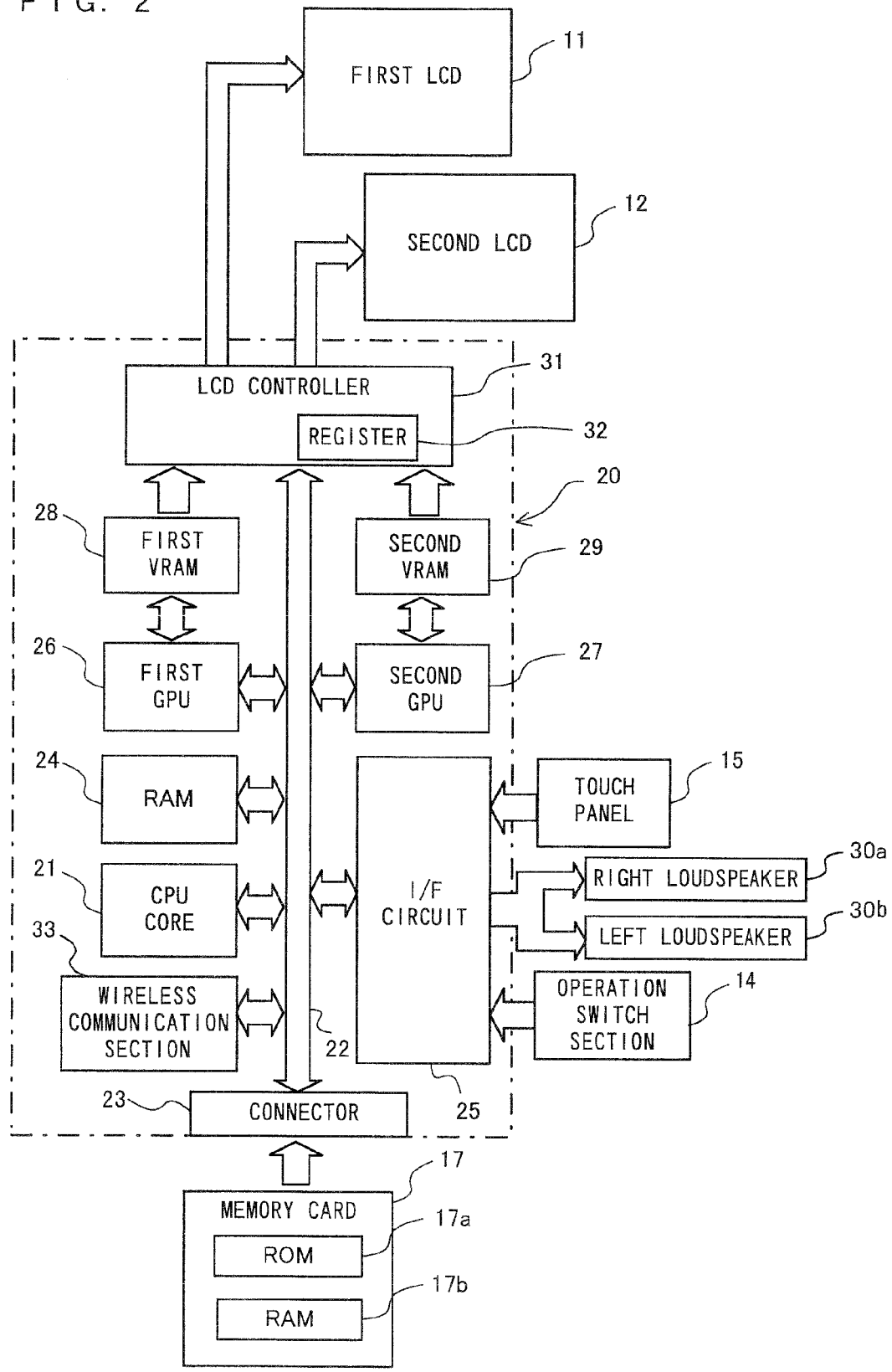
FIG. 2 is a block diagram showing an internal configuration of the game apparatus 1 of FIG. 1.

Next, an internal configuration of the game apparatus 1 will be described with reference to FIG. 2. FIG. 2 is a block diagram showing the internal configuration of the game apparatus 1.

In FIG. 2, a CPU core 21 is mounted on an electronic circuit board 20 which is to be housed in the housing 13. Via a bus 22, the CPU core 21 is connected to a connector 23, an input/output interface circuit (shown as I/F circuit in the diagram) 25, a first GPU (Graphics Processing Unit) 26, a second GPU 27, a RAM 24, an LCD controller 31 and a wireless communication section 33. The memory card 17 is connected to the connector 23 in a removable manner. The memory card 17 includes a ROM 17a for storing a game program and a RAM 17b for storing backup data in a rewritable manner. The game program stored in the ROM 17a of the memory card 17 is loaded to the RAM 24, and the game program having been loaded to the RAM 24 is executed by the CPU core 21. In addition to the game program, the RAM 24 stores as necessary, e.g., data for generating temporary data which is obtained by the CPU core 21 executing the game program. Connected to the I/F circuit 25 are the touch panel 15, the right loudspeaker 30a, the left loudspeaker 30b, and an operation switch section 14 comprising the cross switch 14a, the "A" button 14d and others shown in FIG. 1. The right loudspeaker 30a and the left loudspeaker 30b are arranged inside the sound holes 18a and 18b, respectively, and these loudspeakers reproduce sounds in accordance with sound output information generated by the CPU core 21.

A first VRAM (Video RAM) 28 is connected to the first GPU 26, and a second VRAM 29 is connected to the second GPU 27. In accordance with an instruction from the CPU core 21, the first GPU 26 generates a first display image based on data used for display image generation which is stored in the RAM 24, and writes the first display image into the first VRAM 28. The second GPU 27 also follows an instruction from the CPU core 21 to generate a second display image, and writes the second display image into the second VRAM 29. The first VRAM 28 and the second VRAM 29 are connected to the LCD controller 31.

The LCD controller 31 includes a register 32. The register 32 stores a value of either 0 or 1 in accordance with an instruction from the CPU core 21. When the value of the register 32 is 0, the LCD controller 31 outputs to the first LCD 11 a first game image which has been written into the first VRAM 28, and outputs to the second LCD 12 a second game image which has been written into the second VRAM 29. When the value of the register 32 is 1, the first game image which has been written into the first VRAM 28 is outputted to the second LCD 12, and the second game image which has been written into the second VRAM 29 is outputted to the first LCD 11.

The wireless communication section 33 has functions for exchanging, with the wireless communication section 33 of another game device, data used for a game process and other data. For example, the wireless communication section 33 provides a wireless communication function complying with a wireless LAN standard IEEE 802.11. The wireless communication section 33 outputs received data to the CPU core 21. Also, the wireless communication section 33 transmits, to another game device, data specified by the CPU core 21.

The game program (information processing program) of an exemplary embodiment can be supplied to a computer system not only by way of an external storage medium such as the memory card 17, but also by way of a wired or wireless communication path. The game program can also be stored in advance in a nonvolatile storage device inside of the computer system. Note that, an information storage medium for storing the game program is not limited to the above-mentioned nonvolatile storage device such as a nonvolatile semiconductor memory. The information storage medium may be a CD-ROM, DVD, or other similar optical disc storage medium.

Figure 3:
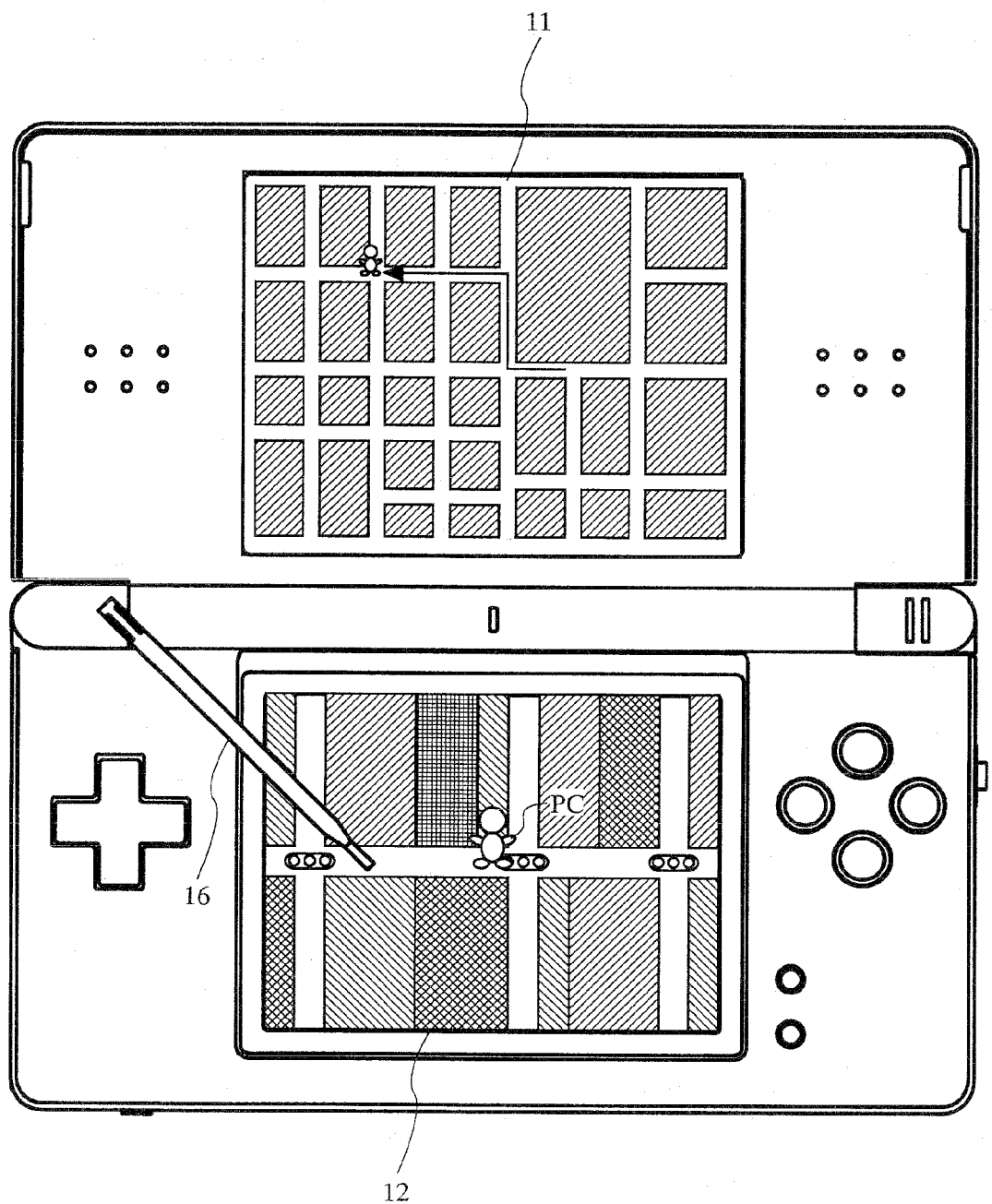
FIG. 3 shows exemplary screen displays on a first LCD 11 and a second LCD 12 of FIG. 1.
Figure 4:
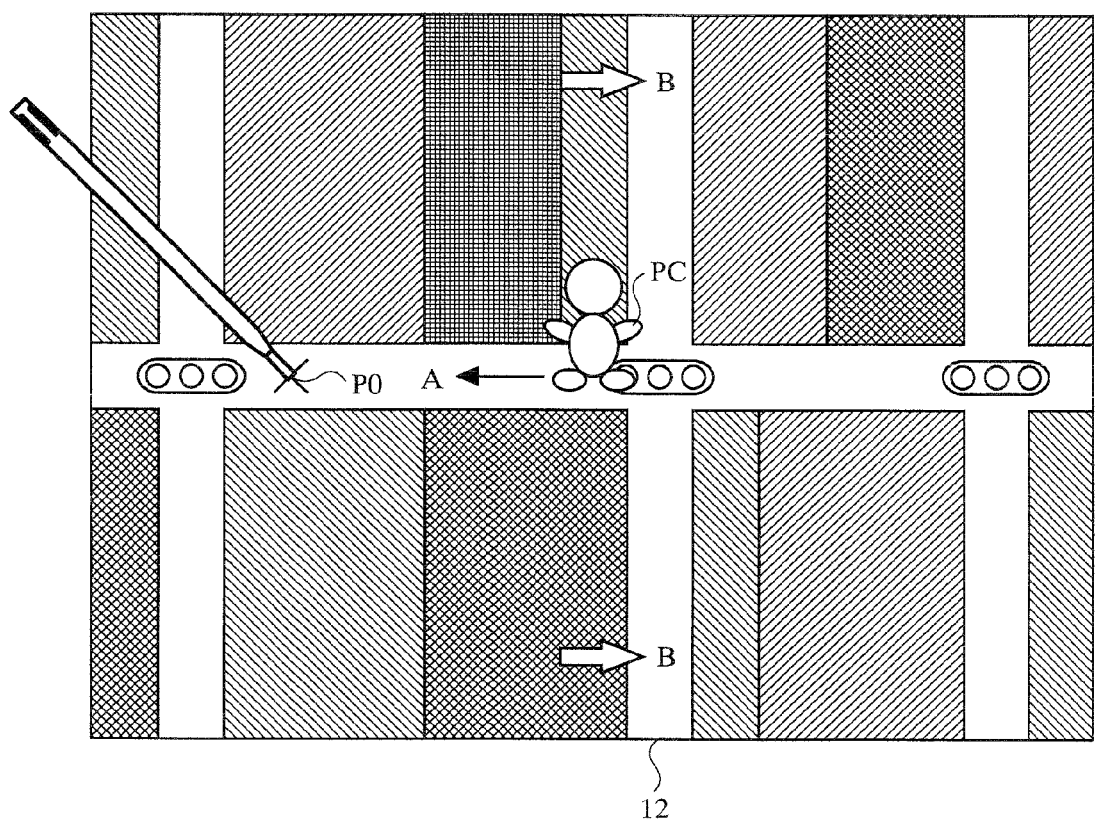
FIG. 4 illustrates a relationship between a position, at which a touch operation is performed on a game image displayed on the second LCD 12 of FIG. 1, and a movement of a player character PC.

Prior to detailed descriptions of processing, which is performed by the game apparatus 1 in accordance with the game program executed by the game apparatus 1, descriptions of exemplary display manners, in which displays are provided on the first LCD 11 and second LCD 12 as a result of the processing, descriptions of exemplary processes and the like will be given with reference to FIGS. 3 to 6. Note that, FIG. 3 shows exemplary screen displays on the first LCD 11 and second LCD 12. FIG. 4 illustrates a relationship between a position, at which a touch operation is performed on a game image displayed on the second LCD 12, and a movement of a player character PC. FIG. 5 illustrates an exemplary manner in which the player character PC moves and the screen scrolls when a touch operation is being performed on the touch panel 15. FIG. 6 illustrates an exemplary manner in which the player character PC moves and the screen scrolls immediately after the player performs a touch-off operation on the touch panel 15 (hereinafter, to remove the stick 16, a finger or the like from the touch panel 15 is described as "perform a touch-off operation", and a state where a touch operation is not performed on the touch panel 15, i.e., a state where the touch panel 15 is not touched by the stick 16, a finger or the like, is referred to as "touch-off state").

FIG. 3 shows the first LCD 11 and second LCD 12 of the game apparatus 1, on each of which a game image is displayed. To be specific, a display on the first LCD 11 shows a state of the entire virtual game world within which the player character PC is allowed to move around, and also shows a position of the player character PC in the virtual game world. The second LCD 12 displays a part of the entire virtual game world, in which the player character PC is positioned at the center thereof.

The example of virtual game world in FIG. 3 shows, with a map-like display, a two-dimensional plane on which the player character PC is allowed to move around. A player of the game apparatus 1 plays a game in which the player causes the player character PC to move on the two-dimensional plane by performing a touch operation on the touch panel 15 provided on a surface of the second LCD 12. Here, the player character PC is set as a game object which is allowed to move along roads (reverse printed areas of FIGS. 3 to 6) on the two-dimensional plane. In the two-dimensional plane, areas which the player character PC cannot enter are shown as pattern areas such as diagonal line areas. In the below description, these pattern areas are occasionally referred to as "obstacles".

In FIG. 4, when the player performs a touch operation on the touch panel 15, a position in the virtual game world which coincides with a touch position of the touch operation (a designated coordinate point P0) is calculated. Then, the player character PC moves on the two-dimensional plane in a direction of the designated coordinate point P0 (as indicated by an arrow A in FIG. 4). In this example of the game, a displayed position of the virtual game world is controlled such that the player character PC is displayed on a predetermined position on the second LCD 12 (e.g., the center of the second LCD 12). To be specific, when the player character PC moves on the two-dimensional plane, the two-dimensional plane moves (scrolls) in an opposite direction to the moving direction of the player character PC (as indicated by arrows B in FIG. 4).

Figure 5A:
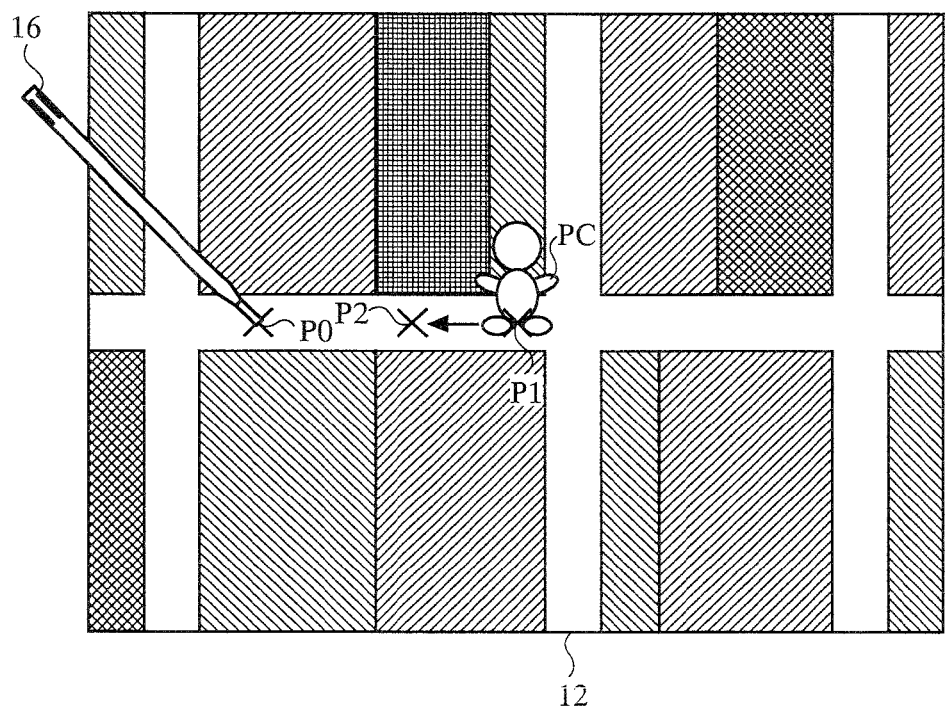
FIG. 5A shows an example of a situation in which a designated coordinate point P0 and target coordinate point P2 have been calculated in accordance with a touch operation.

For example, as shown in FIG. 5A, the player character PC is positioned at a current position coordinate point P1 on the two-dimensional plane, and displayed at the center of the second LCD 12. At this point, if the player performs a touch operation, and the designated coordinate point P0 is calculated as a result, a target coordinate point P2, which is present on a path from the current position coordinate point P1 to the designated coordinate point P0 on the two-dimensional plane, is calculated. Then, the player character PC moves on the two-dimensional plane in a direction of the target coordinate point P2.

Figure 5B:
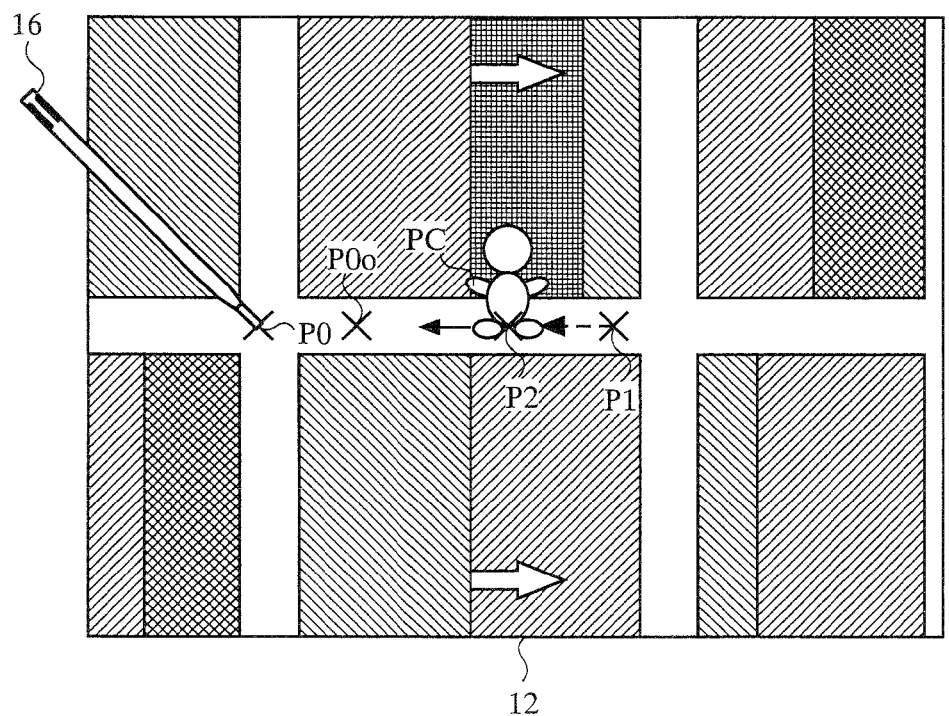
FIG. 5B shows an example in which after the target coordinate point P2 shown in FIG. 5A is set, the player character PC is moved and then displayed.

Here, as shown in FIG. 5B, when the player character PC moves on the two-dimensional plane in the direction of the target coordinate point P2 (as indicated by a dashed line arrow in FIG. 5B), the displayed position of the virtual game world is controlled such that the player character PC is always displayed at the center of the second LCD 12. To be specific, on the second LCD 12, the two-dimensional plane moves in the opposite direction to the moving direction of the player character PC (as indicated by reverse printed arrows in FIG. 5B) such that the display position of the player character PC does not change. Further, when the player changes the touch position on the touch panel 15, or even when the player keeps performing the touch operation at the same position on the touch panel 15, a position on the two-dimensional plane which coincides with the touch position moves in accordance with the above-described scrolling of the two-dimensional plane, and a new designated coordinate point P0 is calculated. For example, as shown in FIG. 5B, when the player character PC is placed at the current position coordinate point P1, a designated coordinate point P0o is calculated, and when the player character PC has moved to the target coordinate point P2, a new designated coordinate point P0 is calculated. Thus, not only when the player changes the touch position but also when the player keeps performing the touch operation at the same position, the designated coordinate point P0 is updated in accordance with the movement of the player character PC. Therefore, by performing a touch operation keeping a touch-on state (hereinafter, a state where a touch operation is being performed on the touch panel 15, i.e., a state where the touch panel 15 is being touched by the stick 16, a finger or the like, is referred to as "touch-on state", and to perform a touch operation on the touch panel 15, i.e., to touch the touch panel 15 by the stick 16, a finger or the like, is described as "perform a touch-on operation"), the player is allowed to have an operation feeling as if the player were always directing the moving direction of the player character PC.

Figure 6A:
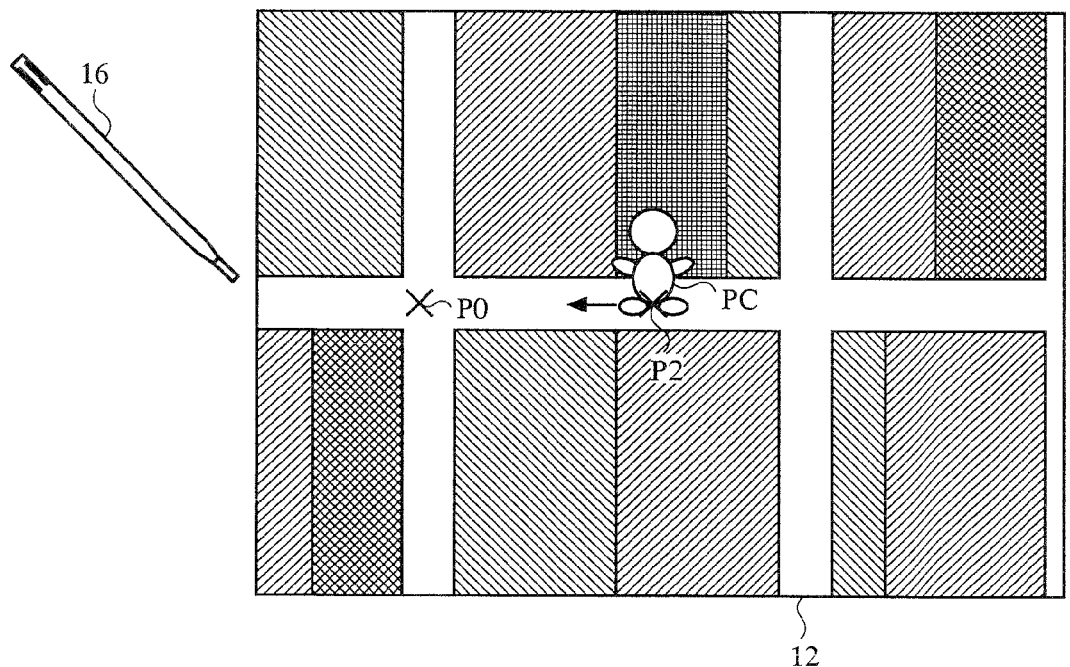
FIG. 6A shows an example of a situation in which the designated coordinate point P0 has been calculated in accordance with a touch-off operation.

As shown in FIG. 6A, when the player removes the stick 16 from the touch panel 15 (i.e, when the player performs a touch-off operation), updating of the designated coordinate point P0 is terminated. In this case, the player character PC continues moving on the two-dimensional plane toward the designated coordinate point P0 (as indicated by an arrow in FIG. 6A) which have been calculated immediately before the touch-off operation.

Figure 6B:
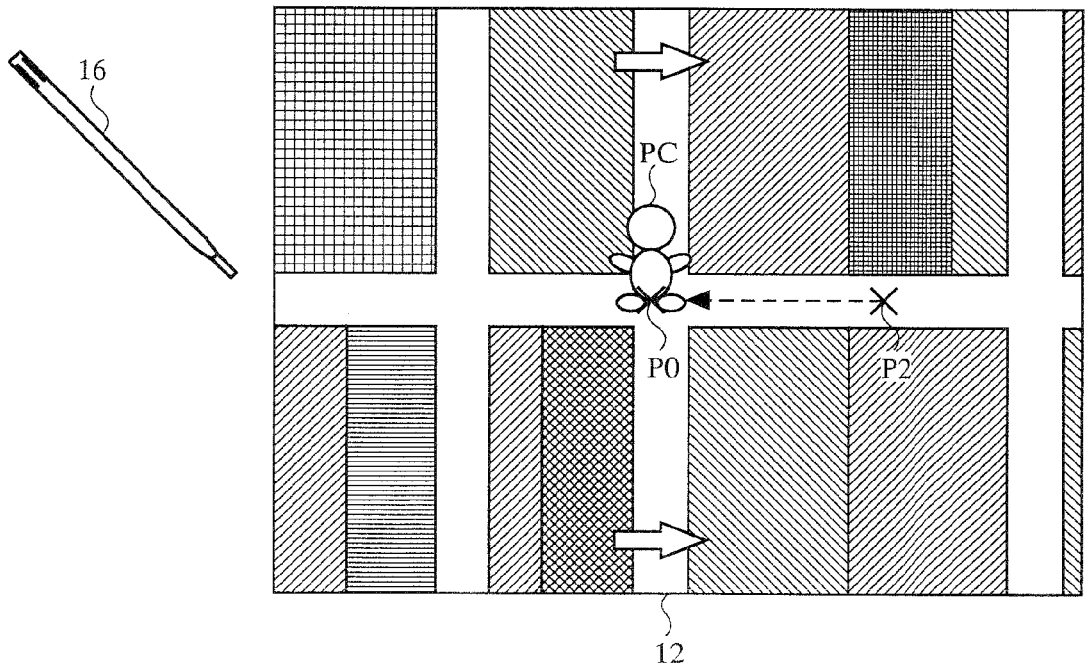
FIG. 6B shows an example in which after the designated coordinate point P0 shown in FIG. 6A is set, the player character PC is moved and then displayed.

As shown in FIG. 6B, when the player character PC moves on the two-dimensional plane toward the designated coordinate point P0 calculated immediately before the touch-off operation, the displayed position of the virtual game world is controlled such that the player character PC is always displayed at the center of the second LCD 12. To be specific, also when the state is touch-off, on the second LCD 12, the two-dimensional plane moves in the opposite direction to the moving direction of the player character PC (as indicated by reverse printed arrows in FIG. 6B) such that the display position of the player character PC does not change. This allows the player to move the player character PC to a position on the two-dimensional plane, which coincides with the touch position obtained immediately before the touch-off operation. Thus, the player can control the moving direction of the player character PC and also specify a destination position of the player character PC, by a same series of touch operations.

Figure 7:
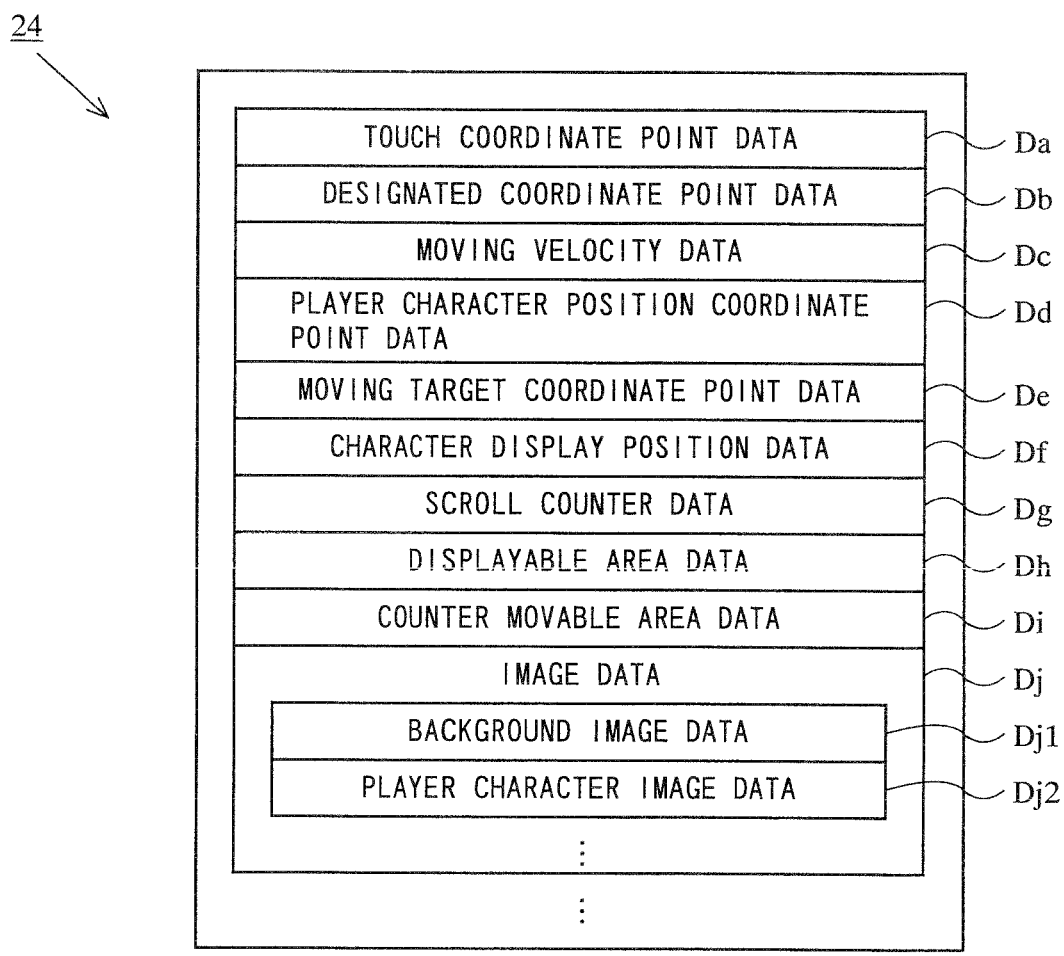
FIG. 7 shows an example of various pieces of data which are stored in a RAM 24 in response to an execution of the game program.
Figure 9:
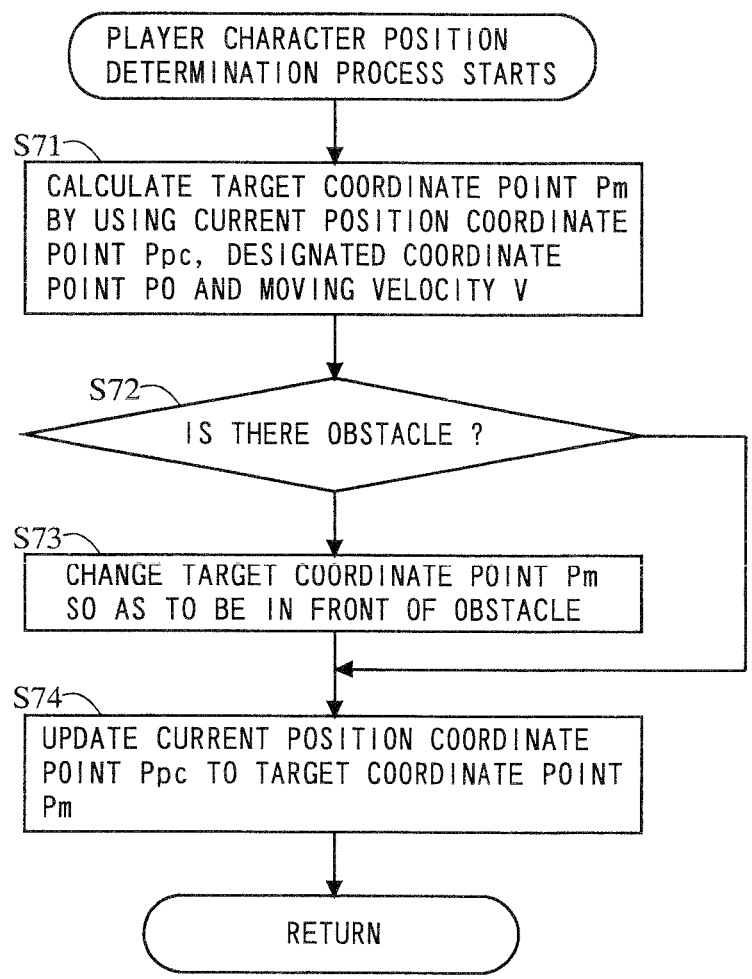
FIG. 9 shows a subroutine showing in detail operations performed in a player character position determination process at step 57 of FIG. 8.
Figure 10:
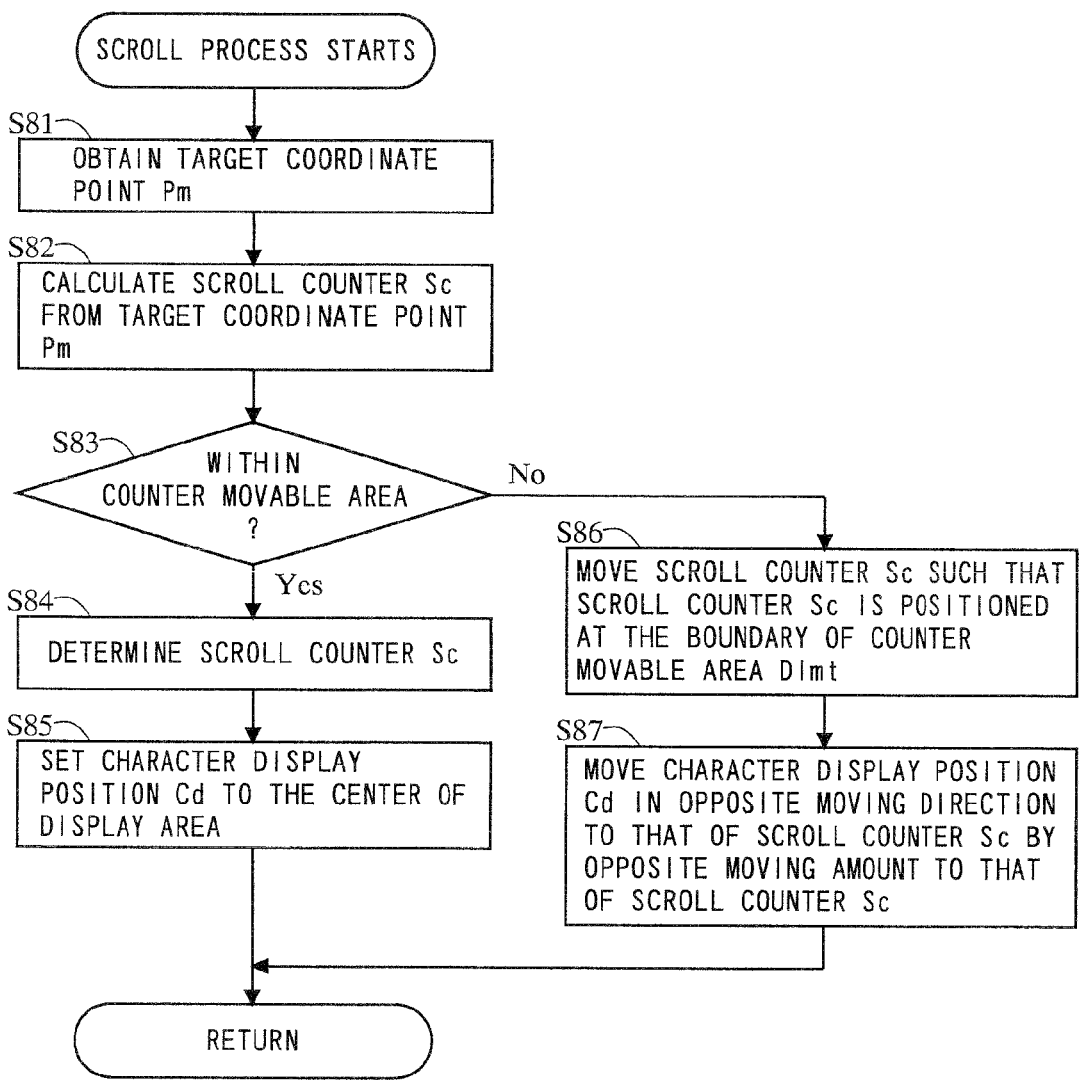
FIG. 10 shows a subroutine showing in detail operations performed in a scroll process at step 58 of FIG. 8.

Next, with reference to FIGS. 7 to 10, the processing, which is performed by the game apparatus 1 in accordance with the game program executed by the game apparatus 1, will be described in detail. FIG. 7 shows an example of various pieces of data which are stored in the RAM 24 in response to the execution of the game program. FIG. 8 is a flowchart showing a game process which the game apparatus 1 performs by executing the game program. FIG. 9 shows a subroutine showing in detail operations performed in a player character position determination process at step 57 of FIG. 8. FIG. 10 shows a subroutine showing in detail operations performed in a scroll process at step 58 of FIG. 8. Note that, programs for executing these processes are contained in the game program stored in the ROM 17a. When power is turned on for the game apparatus 1, these programs in the ROM 17a are loaded to the RAM 24, and then executed by the CPU core 21.

As shown in FIG. 7, the RAM 24 stores the programs loaded from the ROM 17a and temporary data which is generated when the game process is performed. As shown in FIG. 7, touch coordinate point data Da, designated coordinate point data Db, moving velocity data Dc, player character position coordinate point data Dd, moving target coordinate point data De, character display position data Df, scroll counter data Dg, displayable area data Dh, counter movable area data Di, image data Dj and the like are stored in a data storage area of the RAM 24.

The touch coordinate point data Da stores data indicating a touch coordinate point TP which indicates a touch position in a screen coordinate system, at which touch position the player touches the touch panel 15. For example, the touch coordinate point TP is repeatedly obtained at a cycle at which the game process is performed by the game apparatus 1 (e.g., every 1/60 sec). When obtained, the touch coordinate point TP is stored in the touch coordinate point data Da for update.

The designated coordinate point data Db is coordinate point data indicating a position in the virtual game world, which position coincides with the touch coordinate point TP. This coordinate point data indicates the aforementioned designated coordinate point P0. For example, the designated coordinate point P0 is obtained by performing perspective transformation of the touch coordinate point TP into the virtual game world. As one example, the designated coordinate point P0 is obtained by calculating a position on the two-dimensional plane, which position is displayed at the touch coordinate point TP.

The moving velocity data Dc is data indicating a velocity V at which the player character PC moves in the virtual game world. The player character position coordinate point data Dd is data indicating a current position of the player character PC in the virtual game world (current position coordinate point Ppc). The moving target coordinate point data De is data indicating a position in the virtual game world, which position is a target toward which the player character PC moves (target coordinate point Pm). The character display position data Df is data indicating a position on the second LCD 12, in which position the player character PC is displayed (character display position Dc). This position is usually set to a predetermined position on the screen, for example, the center of the screen as described above. The scroll counter data Dg is data indicating a position (scroll counter Sc) of a display area of the virtual game world, which display area is displayed on the second LCD 12. The displayable area data Dh is data indicating an area of the virtual game world which is displayable on the second LCD 12 (displayable area Wlmt). The counter movable area data Di is data indicating a later-described area which corresponds to the displayable area Wlmt and within which the below-described scroll counter Sc can take values (counter movable area Dlmt). The image data Dj contains background image data Dj1, player character image data Dj2 and the like. The background image data Dj1 is image data for displaying, on the game screen, a background image of the virtual game world (e.g., the aforementioned map-like two-dimensional plane). The player character image data Dj2 is image data for displaying, on the game screen, the player character PC in the virtual game world.

First, when a power switch (not shown) of the game apparatus 1 is turned on, the CPU core 21 executes a boot program (not shown), whereby the game program stored in the memory card 17 is loaded into the RAM 24. When the CPU core 21 executes the loaded game program, steps shown in FIGS. 8 to 10 (each step in FIGS. 8 to 10 is abbreviated as "S") are performed.

In FIG. 8, the CPU core 21 performs initial settings of the game (step 51), and then proceeds to a next step of the processing. For example, the initial settings performed by the CPU core 21 at step 51 are: setting the two-dimensional plane in the virtual game world; and setting a later-described scroll restricted area on the two-dimensional plane. Also, the CPU core 21 sets, as the initial settings, the current position coordinate point Ppc and target coordinate point Pm so as to indicate predetermined positions on the two-dimensional plane. The CPU core 21 also initializes game parameters such as the touch coordinate point TP, designated coordinate point P0 and moving velocity V (for example, each parameter is initialized to 0).

Next, the CPU core 21 determines whether or not the player is performing a touch operation on the touch panel 15, i.e., whether or not the current state is touch-on (step 52). When the current state is touch-on, the CPU core 21 proceeds to a next step 53 of the processing. On the other hand, when the player is not performing a touch operation on the touch panel 15, i.e., when the current state is touch-off, the CPU core 21 proceeds to a next step 56 of the processing.

At step 53, the CPU core 21 obtains the touch coordinate point TP indicating a touch position in the screen coordinate system, at which the touch panel 15 is touched. Then, the processing proceeds to a next step. For example, the CPU core 21 updates the touch coordinate point TP stored in the touch coordinate point data Da, by using the obtained touch coordinate point TP.

Next, based on the obtained touch coordinate point TP, the CPU core 21 calculates the designated coordinate point P0 in the virtual game world (step 54), and then proceeds to a next step of the processing. For example, the designated coordinate point P0 is obtained by performing perspective transformation of the touch coordinate point TP into the virtual game world. As one example, the designated coordinate point P0 is obtained by calculating a position on the two-dimensional plane, which position is displayed on the second LCD 12 at the touch coordinate point TP. Then, the CPU core 21 updates the designated coordinate point data Db by using data indicating the calculated designated coordinate point P0.

Figure 11:
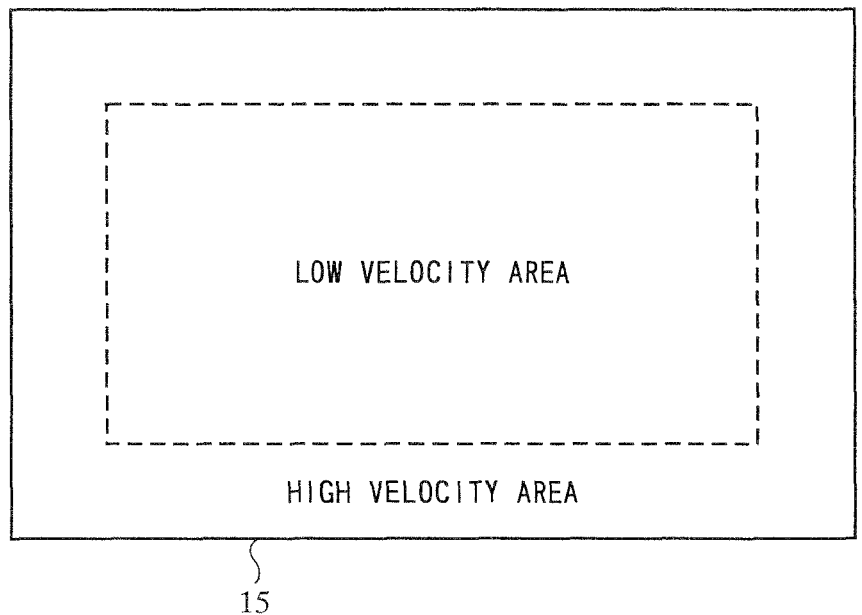
FIG. 11 shows an example in which an operation area on a touch panel 15 is divided into a high velocity area on a outer edge portion of the touch panel and a low velocity area on a central portion of the touch panel.

Next, the CPU core 21 determines the moving velocity V in accordance with the obtained touch coordinate point TP, and updates the moving velocity data Dc (step 55). Then, the processing proceeds to a next step 57. For example, as shown in FIG. 11, the touch panel 15 is divided into a plurality of areas, and the moving velocity V is determined based on which area among the plurality of areas the touch coordinate point TP belongs to. In an example shown in FIG. 11, the touch panel 15 is divided into a high velocity area, which is an outer edge portion of the touch panel, and a low velocity area which is a central portion of the touch panel. In this case, the CPU core 21 sets the moving velocity V to be low when the touch coordinate point TP belongs to the low velocity area, whereas the CPU core 21 sets the moving velocity V to be high when the touch coordinate point TP belongs to the high velocity area. Note that, the above plurality of areas may be provided by dividing the touch panel 15 in a different manner. The touch panel 15 may be divided into more than two areas, and these areas may be set such that the moving velocity V continuously changes. It is understood that when the CPU core 21 sets the moving velocity V for each of the divided areas, various settings are realized. Setting the moving velocity V in this manner allows the moving direction and moving velocity to be specified at the same time. Here, in the process performed at the above step 55, the moving velocity V may be set to be a predetermined fixed value as necessary.

On the other hand, when it is determined at the above step 52 that the current state is touch-off, the CPU core 21 sets the moving velocity V to a predetermined velocity, and updates the moving velocity data Dc (step 56). Then, the processing proceeds to a next step 57.

At step 57, the CPU core 21 performs a process for determining the current position coordinate point Ppc of the player character PC, and then proceeds to a next step of the processing. Hereinafter, the player character position determination process will be described with reference to FIG. 9.

In FIG. 9, the CPU core 21 calculates the target coordinate point Pm by using the current position coordinate point Ppc, designated coordinate point P0 and moving velocity V, and updates the moving target coordinate point data De (step 71). Then, the processing proceeds to a next step. For example, the CPU core 21 calculates the target coordinate point Pm indicating a position which has been moved on the two-dimensional plane, by a variation in proportion to the moving velocity V, from the current position coordinate point Ppc in a direction of the designated coordinate point P0 (e.g., a point P2 shown in FIG. 5A).

Next, the CPU core 21 determines whether or not there is an obstacle between the current position coordinate point Ppc and target coordinate point Pm on the two-dimensional plane (step 72). Referred to as an obstacle here is an area or object which becomes an obstacle for the movement of the player character PC on the two-dimensional plane, for example, the above-described pattern areas which the player character PC cannot enter. When there is an obstacle, the CPU core 21 proceeds to a next step 73 of the processing, whereas when there is not an obstacle, the CPU core 21 proceeds to a next step 74 of the processing.

At step 73, the CPU core 21 changes the target coordinate point Pm so as to indicate a position in front of the obstacle whose presence has been confirmed at the above step 72, and updates the moving target coordinate point data De. Then, the processing proceeds to a next step 74. The position to be described as "in front of the obstacle" may be an intersection point at which a route from the current position coordinate point Ppc to the target coordinate point Pm intersects, at the side of current position coordinate point Ppc, with the obstacle. Here, the target coordinate point Pm may be processed for each coordinate system such that only the x-coordinate or y-coordinate thereof is changed to be that of a coordinate point in front of the obstacle. Alternatively, the target coordinate point Pm may be changed to indicate, among positions beside the obstacle, a nearest position to the target coordinate point Pm, so as to enable the player character PC to move along the obstacle.

At step 74, the CPU core 21 sets the current position coordinate point Ppc to the current target coordinate point Pm, and updates the player character position coordinate point data Dd. Then, the process of the subroutine ends.

Refer to FIG. 8 again. After the process at the above step 57 for determining the current position coordinate point Ppc of the player character PC, the CPU core 21 performs the scroll process (step 58), and then proceeds to a next step of the processing. Hereinafter, the scroll process will be described with reference to FIG. 10.

In FIG. 10, the CPU core 21 obtains the target coordinate point Pm stored in the moving target coordinate point data De (step 81). The CPU core 21 calculates the scroll counter Sc from the target coordinate point Pm, and stores the scroll counter Sc in the scroll counter data Dg (step 82). Then, the CPU core 21 determines whether or not the scroll counter Sc is within the counter movable area Dlmt (step 83). When the scroll counter Sc is within the counter movable area Dlmt, the CPU core 21 proceeds to a next step 84 of the processing. On the other hand, when the scroll counter Sc is outside of the counter movable area Dlmt, the CPU core 21 proceeds to a next step 86 of the processing.

Figure 12:
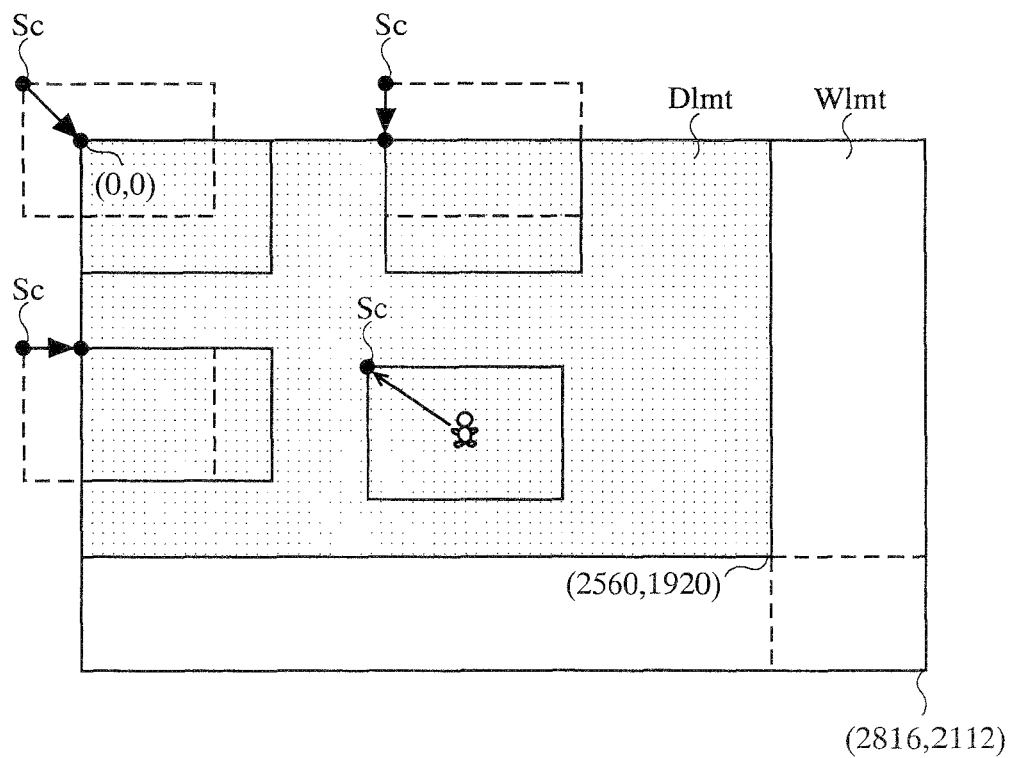
FIG. 12 shows an example of a scroll restricted area Slmt set on a two-dimensional plane S in a virtual game world.
Figure 13A:
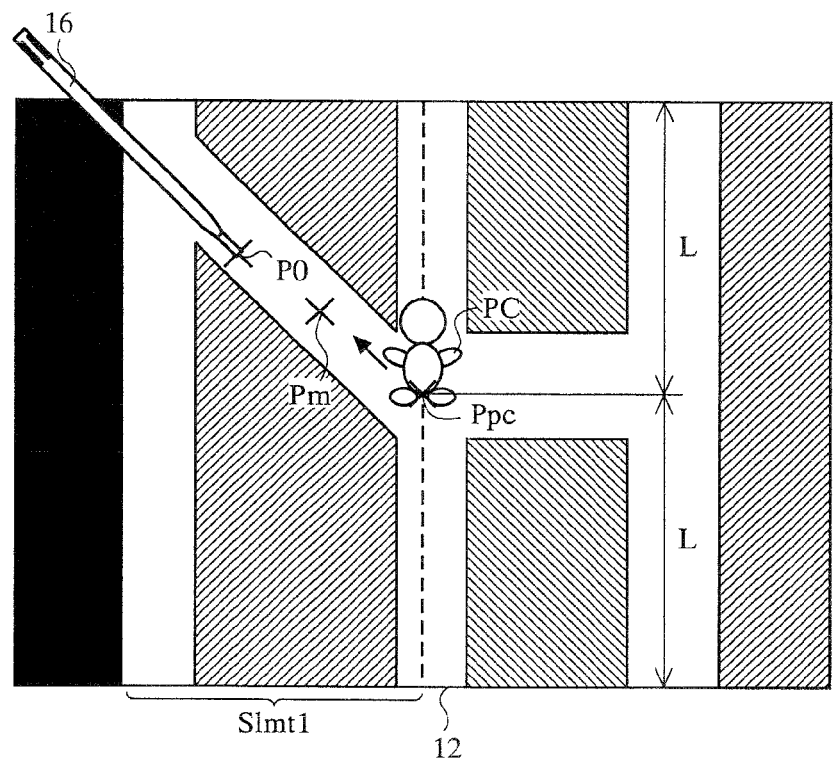
FIG. 13A shows an example in which a target coordinate point Pm is set to be, in a side scroll restricted area Slmt1, in an upper-left direction from a current position coordinate point Ppc.
Figure 13B:
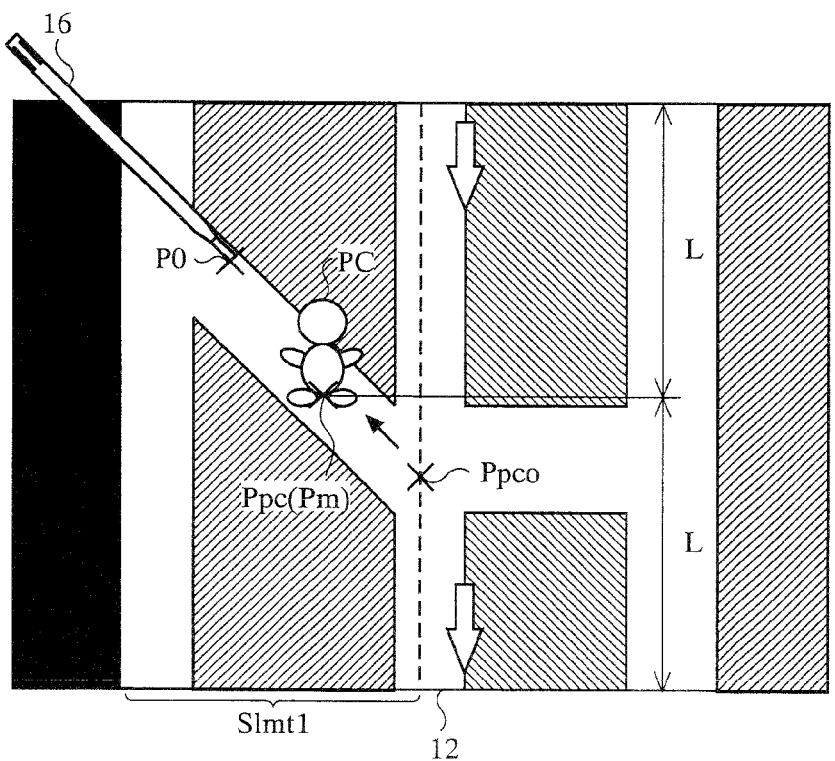
FIG. 13B shows an example in which after the target coordinate point Pm shown in FIG. 13A is set, the player character PC is moved and then displayed.

As shown in FIG. 12, in the two-dimensional plane S set in the virtual game world, the displayable area Wlmt is set. To be specific, only an area within the displayable area Wlmt of the virtual game world is set to be displayed on the second LCD 12. The displayable area Wlmt is also an area of the virtual game world, in which area the player character PC can move around. As shown in FIG. 12, the aforementioned display area is set to be a predetermined area containing the player character PC positioned at the center thereof. This display area can be moved in accordance with a movement of the player character PC. An area within which the display area can be moved is the displayable area Wlmt. Note that, in another exemplary embodiment, when the display position of the player character PC is set to be a predetermined position other than the center of the screen, the display position of the player character PC is set to the predetermined position accordingly. The scroll counter Sc indicates a position of the display area. In this exemplary embodiment, the scroll counter Sc indicates a position of an upper left corner of the display area of the virtual game world, for example. Here, a variation from the center to the upper left corner of the display area may be set as a predetermined fixed vector. Accordingly, at the above step 82, as shown in FIG. 12, the scroll counter Sc is calculated as a position which has been moved from the target coordinate point Pm by the vector.

Since the area within which the display area can be moved is the displayable area Wlmt, when the scroll counter Sc is set to the upper left corner of the display area, an area within which the scroll counter Sc can be moved is the counter movable area Dlmt which is shown as a shaded area in FIG. 12. Accordingly, the CPU core 21 determines at the above step 83 whether or not the scroll counter Sc calculated at the above step 82 is contained in the counter movable area Dlmt.

In the case of determining at the above step 83 that the scroll counter Sc is contained in the counter movable area Dlmt, this determination indicates that the player character PC is displayable at the center of the screen (i.e., at the center of the display area). Accordingly, at step 84, the CPU core 21 determines the scroll counter Sc without moving the scroll counter Sc, and then proceeds to a next step of the processing.

At step 85, the CPU core 21 determines a position on the second LCD 12, at which position the player character PC is to be displayed. To be specific, in order to display the player character PC at the center of the screen, the CPU core 21 sets a character display position Cd to the center of the display area which is set based on the scroll counter Sc determined at the above step 84, and then stores the character display position Cd in the character display position data Df.

On the other hand, in the case of determining at the above step 83 that the scroll counter Sc is not contained in the counter movable area Dlmt, this determination indicates that the display area deviates from the displayable area Wlmt. For this reason, at step 86, the CPU core 21 moves a position of the scroll counter Sc such that one of boundaries of the display area contacts a boundary of the displayable area Wlmt, i.e., such that the scroll counter Sc is positioned at the boundary of the counter movable area Dlmt, and then the CPU core 21 stores the scroll counter Sc in the scroll counter data Dg. The processing then proceeds to a next step 87.

At the time of setting the character display position Cd at step 87, the CPU core 21 moves the character display position Cd such that the character display position Cd is moved in an opposite moving direction to that of the scroll counter Sc of the above step 86 by an opposite moving amount as that of the scroll counter Sc of the above step 86, and then the CPU core 21 stores the character display position Cd in the character display position data Df. To be specific, since the display area of the virtual game space has been moved, a position on the screen, at which position the player character PC is displayed, is moved in the opposite direction so as to maintain that the position at which the player character PC is displayed corresponds to the target coordinate point Pm. In other words, in the case where the position of the player character PC is moved when scrolling of the display cannot be performed any more, the player character PC is displayed at a position deviating from the center of the screen. After having performed the process at the above step 85 or 87, the CPU core 21 returns to the main flow of the processing.

Return to FIG. 8. After the scroll process at the above step 58, the CPU core 21 performs a display process (step 59), and then proceeds to a next step of the processing. To be specific, the CPU core 21 displays, on the second LCD 12, the display area of the virtual game space which is specified by the scroll counter Sc. Then, the CPU core 21 further displays the player character PC at the above-described character display position Cd. In other words, the player character PC is positioned at the current position coordinate point Ppc stored in the player character position coordinate point data Dd. The CPU core 21 also performs a process for displaying, on the first LCD 11, an image of the entire two-dimensional plane in which the player character PC is positioned at the current position coordinate point Ppc.

Next, the CPU core 21 determines whether to end the game (step 60). For example, conditions for ending the game are: when it is determined that the game has been successfully finished or has been failed; and when the player has performed an operation for ending the game. When it is determined to end the game, the CPU core 21 ends the processing of the flowchart. On the other hand, when it is determined to continue the game, the CPU core 21 returns to the above step 52 to reiterate the processing.

Figure 14:
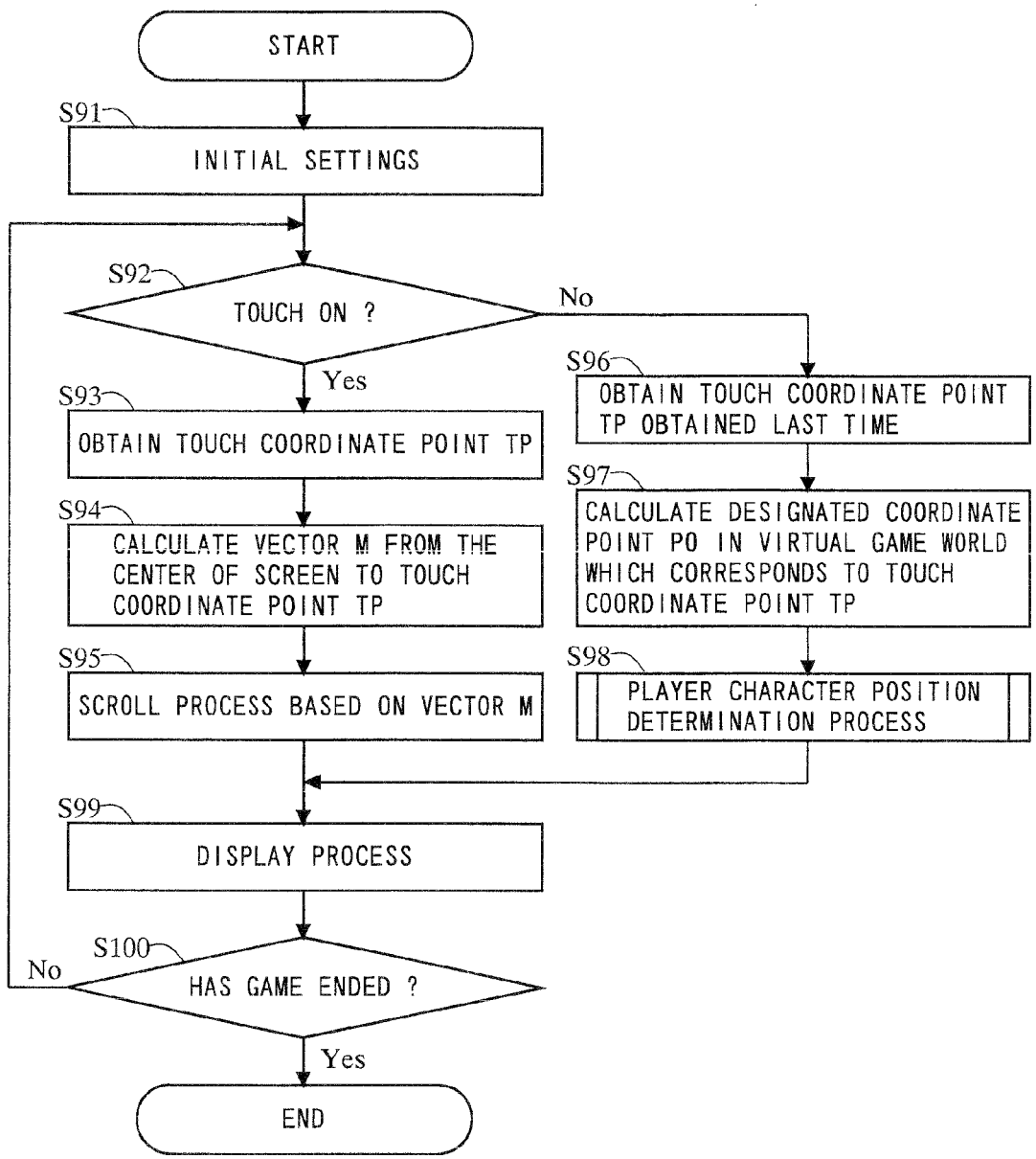
FIG. 14 is a flowchart showing a game process of a first variation which the game apparatus 1 performs by executing the game program of an exemplary embodiment.

In the above description of the game process, an example has been given in which a moving process of the player character PC and a screen scroll process are performed in accordance with a touch-on operation by the player, and the moving process of the player character PC and screen scroll process continue to be performed in accordance with a touch-off operation. However, processes for realizing certain exemplary embodiments may be performed in different manners. Hereinafter, a first variation of the game process will be described with reference to FIG. 14. FIG. 14 is a flowchart showing the game process of the first variation which the game apparatus 1 performs by executing the game program described herein. Programs for performing processes shown herein are contained in the game program stored in the ROM 17a. When the power switch of the game apparatus 1 is turned on, these programs are loaded from the ROM 17a to the RAM 24, and then executed by the CPU core 21.

In FIG. 14, the CPU core 21 performs initial settings of the game (step 91), and then proceeds to a next step of the processing. For example, the initial settings performed by the CPU core 21 at step 91 are: setting the two-dimensional plane in the virtual game world; and setting the current position coordinate point Ppc and target coordinate point Pm so as to indicate predetermined positions on the two-dimensional plane. The CPU core 21 also initializes game parameters such as the touch coordinate point TP, designated coordinate point P0 and moving velocity V (for example, each parameter is initialized to 0).

Next, the CPU core 21 determines whether or not the current state is touch-on (step 92). When the current state is touch-on, the CPU core 21 proceeds to a next step 93 of the processing. On the other hand, when the current state is touch-off, the CPU core 21 proceeds to a next step 96 of the processing.

At step 93, the CPU core 21 obtains the touch coordinate point TP indicating a touch position in the screen coordinate system, at which touch position the touch panel 15 is touched. Then, the processing proceeds to a next step. For example, the CPU core 21 updates the touch coordinate point TP stored in the touch coordinate point data Da, by using the obtained touch coordinate point TP.

Next, the CPU core 21 calculates a vector M from the center of the second LCD 12 to the touch coordinate point TP (step 94). The CPU core 21 performs the scroll process based on the vector M (step 95), and proceeds to a next step 99 of the processing. For example, at the above step 95, the display area of the virtual game world is moved such that the entire image of the virtual game world displayed on the display screen of the second LCD 12 moves in a direction indicated by the vector M. Here, since the vector M indicates a direction from the center of the screen to the touch position, the screen scroll process is performed based on a position where the player performs a touch operation on the touch panel 15.

On the other hand, at step 96, the CPU core 21 obtains the touch coordinate point TP obtained last time, and proceeds to a next step of the processing. Here, the touch coordinate point TP obtained last time is the touch coordinate point TP obtained immediately before a touch-off operation. Accordingly, the CPU core 21 obtains the touch coordinate point TP, which has been stored in the touch coordinate point data Da at that point in time.

Next, the CPU core 21 calculates the designated coordinate point P0 in the virtual game world, which corresponds to the touch coordinate point TP obtained at the above step 96 (step 97), and then proceeds to a next step of the processing. Since the calculation of the designated coordinate point P0 at step 97 is the same as that performed at the above-described step 54, a detailed description thereof will be omitted.

Next, the CPU core 21 performs a process for determining the current position coordinate point Ppc of the player character PC (step 98), and proceeds to a next step 99 of the processing. Here, in the player character position determination process at the above step 98, the moving velocity V is set to a predetermined velocity in the same manner as that of the above-described step 57. Therefore, a detailed description of the player character position determination process at step 98 will be omitted.

At step 99, the CPU core 21 performs the display process, and proceeds to a next step of the processing. To be specific, the CPU core 21 places the player character PC at the current position coordinate point Ppc stored in the player character position coordinate point data Dd, and performs a process for displaying, on the second LCD 12, the display area set at the above step 95. The CPU core 21 also performs a process for displaying, on the first LCD 11, an image of the entire two-dimensional plane on which the player character PC is placed at the current position coordinate point Ppc.

Next, the CPU core 21 determines whether or not to end the game (step 100). For example, conditions for ending the game are: when it is determined that the game has been successfully finished or has been failed; and when the player has performed an operation for ending the game. When it is determined to end the game, the CPU core 21 ends the processing of the flowchart. On the other hand, when it is determined to continue the game, the CPU core 21 returns to the above-described step 92 to reiterate the processing.

As described above, in the game process of the first variation, the screen scroll process is performed in accordance with a touch-on operation by the player, and the moving process of the player character PC is performed in accordance with a touch-off operation by the player.

Figure 15:
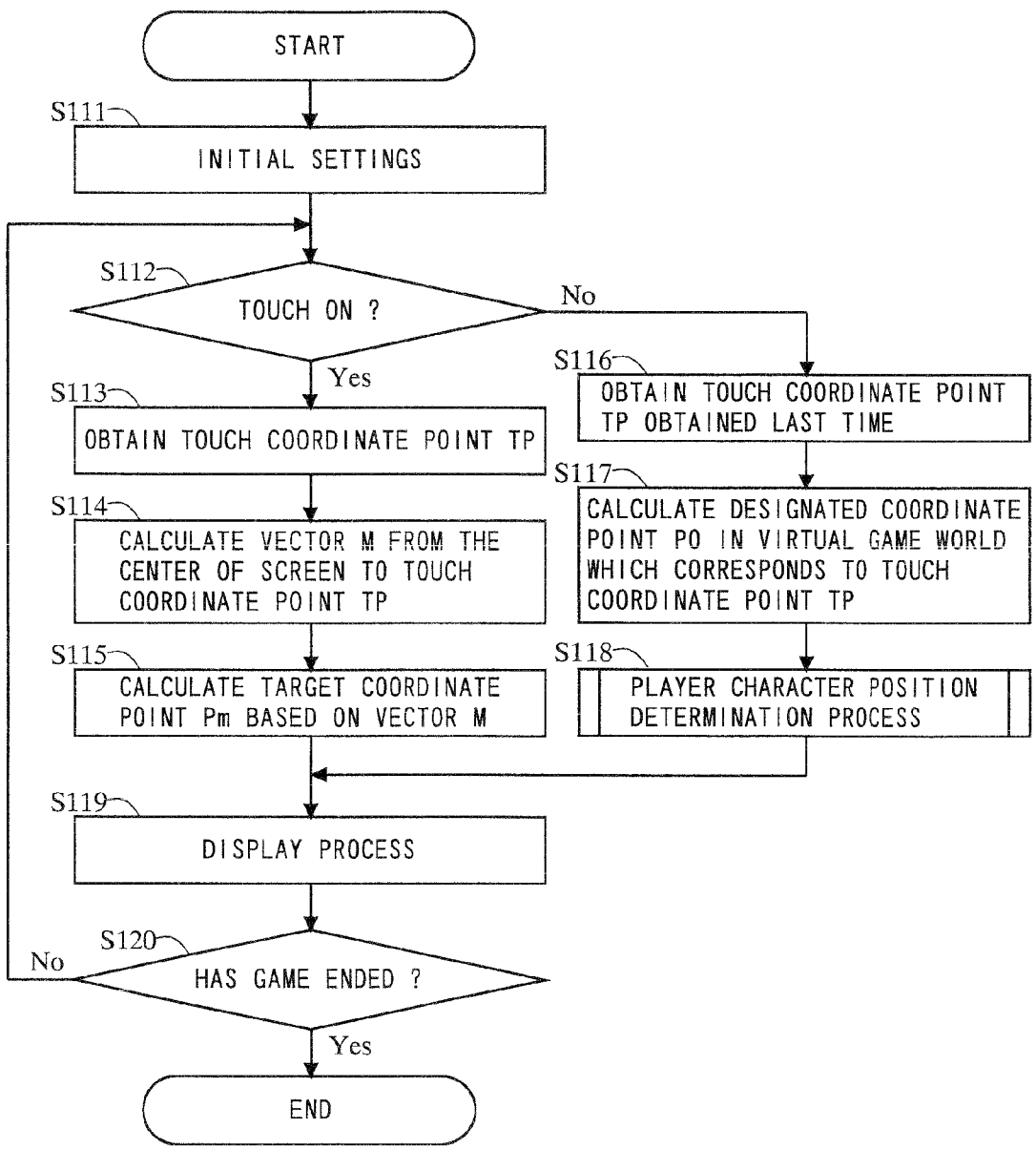
FIG. 15 is a flowchart showing a game process of a second variation which the game apparatus 1 performs by executing the game program of an exemplary embodiment.

Hereinafter, a second variation of the game process will be described with reference to FIG. 15. FIG. 15 is a flowchart showing the game process of the second variation which the game apparatus 1 performs by executing the game program described herein. Programs for performing processes shown herein are contained in the game program stored in the ROM 17a. When the power switch of the game apparatus 1 is turned on, these programs are loaded from the ROM 17a to the RAM 24, and then executed by the CPU core 21.

In FIG. 15, the CPU core 21 performs initial settings of the game (step 111), and then proceeds to a next step of the processing. For example, the initial settings performed by the CPU core 21 at step 111 are: setting the two-dimensional plane in the virtual game world; and setting the current position coordinate point Ppc and target coordinate point Pm so as to indicate predetermined positions on the two-dimensional plane. The CPU core 21 also initializes game parameters such as the touch coordinate point TP, designated coordinate point P0 and moving velocity V (for example, each parameter is initialized to 0).

Next, the CPU core 21 determines whether or not the current state is touch-on (step 112). When the current state is touch-on, the CPU core 21 proceeds to a next step 113 of the processing. On the other hand, when the current state is touch-off, the CPU core 21 proceeds to a next step 116 of the processing.

At step 113, the CPU core 21 obtains the touch coordinate point TP indicating a touch position in the screen coordinate system, at which the touch panel 15 is touched. Next, the CPU core 21 calculates the vector M from the center of the screen of the second LCD 12 to the touch coordinate point TP (step 114), and then proceeds to a next step of the processing. Since the processes performed at steps 113 and 114 are the same as those performed at the above-described steps 93 and 94, detailed descriptions thereof will be omitted.

Next, the CPU core 21 calculates the target coordinate point Pm based on the vector M (step 115), and then proceeds to a next step 119 of the processing. For example, at the above step 115, the CPU core 21 uses the current position coordinate point Ppc and vector M to calculate the target coordinate point Pm and then update the moving target coordinate point data De. For example, the CPU core 21 converts a direction and size of the vector M into a moving direction and moving amount in the virtual game world. Then, the CPU core 21 calculates, as the target coordinate point Pm, a point which has been moved on the two-dimensional plane from the current position coordinate point Ppc in the above moving direction by a variation corresponding to the above moving amount.

On the other hand, at step 116, the CPU core 21 obtains the touch coordinate point TP obtained last time. Next, the CPU core 21 calculates the designated coordinate point P0 in the virtual game world, which corresponds to the touch coordinate point TP obtained at the above step 116 (step 117). Then, after performing a process for determining the current position coordinate point Ppc of the player character PC (step 118), the CPU core 21 proceeds to a next step 119 of the processing. Since the processes at steps 116 to 118 are the same as the processes at the above-described steps 96 to 98, detailed description thereof will be omitted.

At step 119, the CPU core 21 performs the display process, and then proceeds to a next step of the processing. To be specific, the CPU core 21 places the player character PC at the current position coordinate point Ppc stored in the player character position coordinate point data Dd, and performs a process for displaying, on the second LCD 12, a predetermined display area of the virtual game world. The CPU core 21 also performs a process for displaying, on the first LCD 11, an image of the entire two-dimensional plane on which the player character PC is placed at the current position coordinate point Ppc.

Next, the CPU core 21 determines whether or not to end the game (step 120). For example, conditions for ending the game are: when it is determined that the game has been successfully finished or has been failed; and when the player has performed an operation for ending the game. When it is determined to end the game, the CPU core 21 ends the processing of the flowchart. On the other hand, when it is determined to continue the game, the CPU core 21 returns to the above-described step 112 to reiterate the processing.

As described above, in the game process of the second variation: a process, for moving the player character PC by using a direction and moving amount corresponding to a touch-on operation performed by the player, is performed; and a process, for moving the player character PC to a position obtained immediately before a touch-off operation is performed, is performed in accordance with the touch-off operation.

Figure 16:
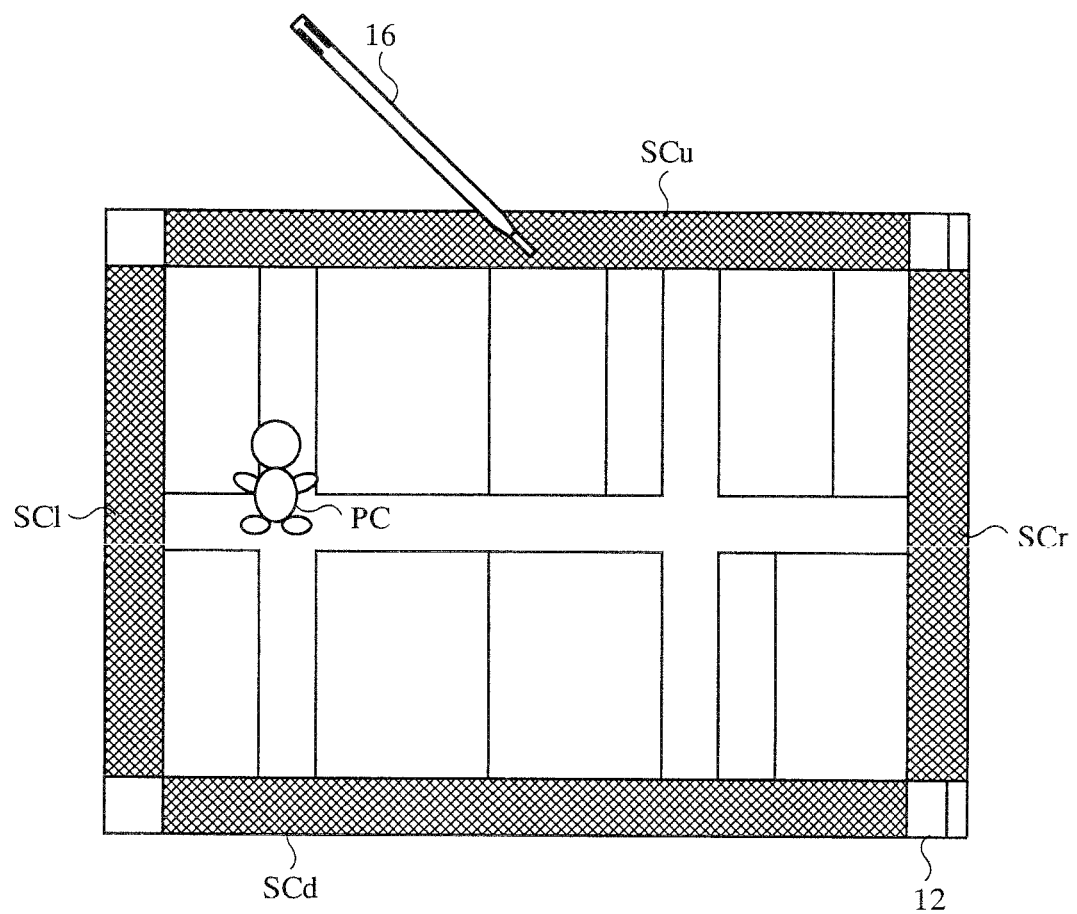
FIG. 16 shows an example in which upper edge, lower edge, left side edge and right side edge portions of the second LCD 12 (touch panel 15) each are provided with a scroll area SC.

Although the above-described second variation shows an example in which the screen scroll process is not performed, the screen scroll process may be performed in accordance with a touch operation. For example, as shown in FIG. 16, upper edge, lower edge, left side edge and right side edge portions of the second LCD 12 (touch panel 15) each may be provided with a scroll area SC. To be specific, the upper edge portion of the second LCD 12 is provided with an upward scroll area SCu with which to perform upward screen scrolling; the lower edge portion of the second LCD 12 is provided with a downward scroll area SCd with which to perform downward screen scrolling; the left side edge portion of the second LCD 12 is provided with a leftward scroll area SCl with which to perform leftward screen scrolling; and the right side edge portion of the second LCD 12 is provided with a rightward scroll area SCr with which to perform rightward screen scrolling. This allows the player to perform, by performing a touch operation on any one of the scroll areas SC while performing the above-described operation for moving the player character PC during the touch-on state, screen scrolling based on the touched scroll area SC. Since each scroll area SC is set to a position corresponding to an actual screen scrolling direction as shown in FIG. 16, the player can readily recognize a direction in which the screen is scrolled. Further, during the touch-on state, a direction in which to move the player character PC coincides with a direction in which the screen is scrolled. This improves operability.

Thus, the above-described processes performed by the game apparatus 1 allow an operation, for moving an object by using a coordinate point input performed by touching the touch panel 15, to be more intuitively performed. To be specific, in certain exemplary embodiments, a plurality of operation inputs can be performed using touch-on and touch-off operations of a series of touch operations. For example, certain exemplary embodiments realize an operation method by which: an operation for moving the display area of the virtual game world, which display area is displayed on the display screen, can be performed during the touch-on state; and an operation for specifying a destination of an object can be performed during a touch-off state. Certain exemplary embodiments further realize an operation method by which: an operation for controlling the moving direction and moving amount of the object can be performed during the touch-on state; and an operation for specifying the destination of the object can be performed during the touch-off state.

In the above description of the game process, the game, in which the player character PC moves on the two-dimensional plane set in the virtual game world, is used. However, the certain exemplary embodiments described herein may be applied to a game in which the player character PC moves within a three-dimensional space. In this case, it is understood that in a similar manner to that of the above-described processes, the certain exemplary embodiments described herein can be realized by calculating a position in the three-dimensional space, which coincides with the touch coordinate point TP, as a three-dimensional coordinate point, and also by calculating other parameters three-dimensionally. In the above first and second variations, a process, in which the vector M from the center of the screen to the touch coordinate point TP is used, is performed during the touch-on state. This process is suitable for performing inputs for successive movements in the three-dimensional space. This process also allows a position in the three-dimensional space, which coincides with the touch coordinate point TP obtained when a touch-off operation is performed, to be precisely specified.

In the above description of the screen scroll process, an example, in which the display area of the two-dimensional plane set in the virtual game world is moved along the two-dimensional plane, i.e., an example in which the display area is moved two-dimensionally, is used. However, the display area may be moved in a different manner. For example, in the case where the player character PC moves on a three-dimensional figure (e.g., a sphere) which is set in the virtual game world, a process for rotating, based on the touch coordinate point TP, the three-dimensional figure with respect to a virtual camera may be performed so as to move the display area. Further, the three-dimensional figure may be fixed, and a process for moving, based on the touch coordinate point TP, the virtual camera around the fixed three-dimensional figure may be performed so as to move the display area.

Further, the above-described embodiment shows an exemplary liquid crystal display section having two screens, in which the first LCD 11 and second LCD 12, which are physically separated from each other, are disposed one on top of the other (i.e., the liquid crystal display section has an upper screen and a lower screen). However, these two display screens may have another structure. For example, the first LCD 11 and second LCD 12 may be aligned side-by-side on one principal surface of the lower housing 13b. Further, a vertically long LCD, which has the same horizontal width as the second LCD 12 and twice the vertical length of the second LCD 12 (that is, the LCD is a physically single LCD but has a display size of vertically provided two screens), may be disposed on one principal surface of the lower housing 13b so as to display the first and second game images one on top of the other (that is, the first and second game images are displayed one on top of the other with no boundary portion being provided). Moreover, a horizontally long LCD, which has the same vertical length as the second LCD 12 and twice the horizontal width of the second LCD 12, may be disposed on one principal surface of the lower housing 13b so as to display the first and second game images side-by-side (that is, the first and second game images may be side-by-side displayed adjacent to each other with no boundary portion being provided). That is, a physically single screen may be divided in two screens so as to display the first and second game images, respectively. The certain exemplary embodiments described herein can be similarly realized with any of the aforementioned manners of displaying the game images, by disposing the touch panel 15 on a screen on which the above-described game image displayed on the second LCD 12 is displayed. Furthermore, in the case where the physically single screen is divided into two screens so as to display the first and second game images, respectively, the touch panel 15 may be disposed all over the whole screen (so as to cover the two screens).

In addition, in the above-described embodiment, the touch panel 15 is integrated into the game apparatus 1. Needless to say, however, even if the game apparatus and the touch panel are separately provided, the certain exemplary embodiments described herein can be realized. Further, the touch panel 15 may be provided on the upper principal surface of the first LCD 11 so as to display, on the first LCD 11, the above-described game image displayed on the second LCD 12. Furthermore, although two display screens (that is, the first LCD 11 and second LCD 12) are provided in the above-described embodiment, the number of display screens may be one. That is, in the above-described embodiment, it is also possible to provide only the second LCD 12 as a display screen and the touch panel 15 thereon without the first LCD 11 being provided. In addition, in the above-described embodiment, the second LCD 12 may not be provided and the touch panel 15 may be provided on the upper principal surface of the first LCD 11. Then, the above-described game image displayed on the second LCD 12 may be displayed on the first LCD 11.

Although the touch panel 15 is used in the above-described embodiment as an input device, which enables a coordinate point input, of the game apparatus 1, a different pointing device may be used. Used here as a pointing device is an input device for designating an input position or coordinate point on a screen. For example, when a mouse, a track pad, a track ball or the like is used as input means, and positional information in a screen coordinate system, which is calculated based on an output value outputted from the input means, is used, the certain exemplary embodiments described herein can be realized in a similar manner.

In such a case, the certain exemplary embodiments described herein can be realized by using the positional information in the screen coordinate system as the touch coordinate point TP for the above-described processing. However, the determination in the above-described processing as to whether the state is touch-on or touch-off is performed alternatively based on a presence, absence or change of an input from the input means other than an input of the positional information. For example, the determination whether the state is touch-on or touch-off is performed alternatively based on whether or not an operation button provided on the input means is being pressed (e.g., whether a right or left mouse button is being clicked).

In the case of a stationary game apparatus with which a player holding a game controller plays a game, a different pointing device may be used. For example, a camera fixed on the housing of the game controller may be used as the pointing device. In this case, an image taken by the camera changes in accordance with a change in a position pointed by the housing of the game controller. Accordingly, a coordinate point indicating a position on a display screen which is pointed by the housing can be calculated by analyzing the taken image.

In such a case, certain exemplary embodiments described herein can be realized by using the coordinate point indicating the position pointed by the housing as the touch coordinate point TP for the above-described processing. However, the determination in the above-described processing as to whether the state is touch-on or touch-off is performed alternatively based on a presence, absence or change of an input from the game controller other than an input of the coordinate point. As a first example, the determination whether the state is touch-on or touch-off is performed alternatively based on whether or not an operation button provided on the game controller is being pressed (e.g., it is determined as touch-on when an A button is being pressed). As a second example, the game controller consists of two housings. These two housings are: one housing on which the above-mentioned camera is mounted; and the other housing on which a detection unit, such as an acceleration sensor for outputting a signal in accordance with a motion of the said other housing, is fixed. In this case, the determination whether the state is touch-on or touch-off is performed alternatively based on the motion of the said other housing (e.g., it is determined as touch-on when the said other housing is tilted in a predetermined direction). As a third example, the housing of the game controller is provided with voice input means such as a microphone. In this case, the determination is switched between touch-on and touch-off when the player utters a predetermined sound.

A pointing device of a stationary game apparatus with which a player holding a game controller plays a game may be additionally provided outside of the housing of the game controller. In one example, a camera takes, from outside of the housing, an image having the housing as a subject, and by analyzing an image of the housing within the taken image, the coordinate point indicating the position on the display screen, which is pointed by the housing, can be calculated. Further, a system, in which a unit fixed on the housing and another unit provided outside of the housing operate in cooperation with each other, may be used. For example, a light emitting unit is provided outside of the housing, and a camera fixed on the housing takes an image of a light emitted from the light emitting unit. By analyzing the image taken by the camera, the coordinate point indicating the position on the display screen which is pointed by the housing can be calculated.

In the above embodiment, descriptions have been given using the handheld game apparatus 1 and stationary game apparatus. However, the certain exemplary embodiments described herein may also be realized by executing the information processing program of the certain exemplary embodiments described herein by using such an information processing apparatus as a generally used personal computer or the like.

The information processing apparatus and the storage medium for storing the information processing program of the certain exemplary embodiments described herein allow, in operations for moving an object by using coordinate point inputs provided from a pointing device, operation inputs to be more intuitively performed. The information processing apparatus and the storage medium for storing the information processing program of the certain exemplary embodiments described herein are useful as a game apparatus and a game program which use a coordinate point input to move an object such as a player character within, e.g., a virtual game world.

While the certain exemplary embodiments have been described in detail, the foregoing description is in all aspects illustrative and not restrictive. It is understood that numerous other modifications and variations can be devised without departing from the scope thereof.

What is claimed is:

1. A non-transitory computer-readable storage medium having stored therein an information processing program to be executed by a computer of an information processing apparatus for displaying a virtual space on a display device, obtaining an input coordinate point based on an output from a pointing device, which output is based on an operation performed by a user, and moving an object in the virtual space in accordance with the input coordinate point, the information processing program causing the computer to perform:

obtaining the input coordinate point from the pointing device;

setting a plurality of areas in a range that allows an input of the input coordinate point, and setting a moving velocity of the object in accordance with, among the plurality of areas, an area to which the input coordinate point corresponding to an operation performed by the user belongs;

moving the object in accordance with the moving velocity; and displaying on the display device the virtual space in which the object is placed, wherein the moving velocity is set in accordance with, among the plurality of areas, an area to which a single position indicated by the input coordinate point belongs.

2. The non-transitory computer-readable storage medium having stored therein the information processing program according to claim 1, wherein the range is divided at least into a central area placed in a central portion of the range and an outer edge area placed in an outer edge portion of the range, the outer edge portion being a periphery of the central area, and a value for the moving velocity to be used when the input coordinate point belongs to the central area and a value for the moving velocity to be used when the input coordinate point belongs to the outer edge area are set to be different.

3. The non-transitory computer-readable storage medium having stored therein the information processing program according to claim 1, wherein the pointing device is a touch panel covering a display screen of the display device, a touch coordinate point output from the touch panel is obtained as the input coordinate point, and the touch panel is divided into a plurality of areas, and the moving velocity is set in accordance with, among the plurality of areas, an area to which the touch coordinate point belongs.

4. The non-transitory computer-readable storage medium having stored therein the information processing program according to claim 1, wherein the object is moved to a position in the virtual space as a moving target, the position corresponding to said single position.

5. An information processing apparatus for displaying a virtual space on a display device, obtaining an input coordinate point based on an output from a pointing device, which output is based on an operation performed by a user, and moving an object in the virtual space in accordance with the input coordinate point, the information processing apparatus comprising a computer configured to perform at least:

obtaining the input coordinate point from the pointing device;

setting a plurality of areas in a range that allows an input of the input coordinate point, and setting a moving velocity of the object in accordance with, among the plurality of areas, an area to which the input coordinate point corresponding to an operation performed by the user belongs;

moving the object in accordance with the moving velocity; and displaying on the display device the virtual space in which the object is placed, wherein the moving velocity is set in accordance with, among the plurality of areas, an area to which a single position indicated by the input coordinate point belongs.

6. An information processing system for displaying a virtual space on a display device, obtaining an input coordinate point based on an output from a pointing device, which output is based on an operation performed by a user, and moving an object in the virtual space in accordance with the input coordinate point, the information processing system comprising a computer configured to perform at least:

obtaining the input coordinate point from the pointing device;

setting a plurality of areas in a range that allows an input of the input coordinate point, and setting a moving velocity of the object in accordance with, among the plurality of areas, an area to which the input coordinate point corresponding to an operation performed by the user belongs;

moving the object in accordance with the moving velocity; and displaying on the display device the virtual space in which the object is placed, wherein the moving velocity is set in accordance with, among the plurality of areas, an area to which a single position indicated by the input coordinate point belongs.

7. An information processing method for displaying a virtual space on a display device, obtaining an input coordinate point based on an output from a pointing device, which output is based on an operation performed by a user, and moving an object in the virtual space in accordance with the input coordinate point, the information processing method comprising:

obtaining the input coordinate point from the pointing device;

setting a plurality of areas in a range that allows an input of the input coordinate point, and setting a moving velocity of the object in accordance with, among the plurality of areas, an area to which the input coordinate point corresponding to an operation performed by the user belongs;

moving the object in accordance with the moving velocity; and displaying on the display device the virtual space in which the object is placed, wherein the moving velocity is set in accordance with, among the plurality of areas, an area to which a single position indicated by the input coordinate point belongs.

\* \* \* \* \*